(12) United States Patent
Ahn et al.

(10) Patent No.: US 10,537,853 B2
(45) Date of Patent: Jan. 21, 2020

(54) METHOD OF REMOVING VOLATILE COMPOUNDS FROM EMULSIONS

(71) Applicant: Dow Corning Corporation, Midland, MI (US)

(72) Inventors: Dongchan Ahn, Midland, MI (US); Aaron Greiner, Midland, MI (US); Mark Keinath, Saginaw, MI (US); James Thompson, Sanford, MI (US)

(73) Assignee: Dow Silicones Corporation, Midland, MI (US)

( * ) Notice: Subject to any disclaimer, the term of this patent is extended or adjusted under 35 U.S.C. 154(b) by 0 days.

(21) Appl. No.: 15/741,931

(22) PCT Filed: Sep. 23, 2016

(86) PCT No.: PCT/US2016/053227
§ 371 (c)(1),
(2) Date: Jan. 4, 2018

(87) PCT Pub. No.: WO2017/053647
PCT Pub. Date: Mar. 30, 2017

(65) Prior Publication Data
US 2018/0200675 A1    Jul. 19, 2018

Related U.S. Application Data

(60) Provisional application No. 62/232,121, filed on Sep. 24, 2015.

(51) Int. Cl.
*B01D 61/36* (2006.01)
*B01D 61/24* (2006.01)
(Continued)

(52) U.S. Cl.
CPC ......... *B01D 61/362* (2013.01); *B01D 61/246* (2013.01); *B01D 63/02* (2013.01);
(Continued)

(58) Field of Classification Search
CPC .... C08L 83/00; C09J 183/04; B01D 2311/13; B01D 2325/38; B01D 61/362; B01D 63/02; B01D 71/70
See application file for complete search history.

(56) References Cited

U.S. PATENT DOCUMENTS 5,263,409 A    11/1993    van Eikeren et al.
5,843,209 A *  12/1998    Ray ........................ B01D 53/22
                                                    95/52
(Continued)

FOREIGN PATENT DOCUMENTS

| JP | H10180046 | 7/1998 |
| WO | 0144350 A1 | 6/2001 |
| WO | 2014052419 A1 | 4/2014 |

OTHER PUBLICATIONS

Japanese Office Action for the corresponding Japanese Application No. 2018-531318; dated Jan. 28, 2019; 12 pages.

*Primary Examiner* — Ana M Fortuna
(74) *Attorney, Agent, or Firm* — Ed Black; Cantor Colburn LLP

(57) ABSTRACT

Various embodiments disclosed relate to methods of separating volatile compounds from a liquid feed mixture comprising an emulsion. In various embodiments, the method includes contacting a first side of a first membrane with a liquid feed mixture including an emulsion having a polymer, and at least one volatile compound. The method can also include contacting a second side of the first membrane with a sweep medium including at least one a sweep fluid to produce a permeate mixture on the second side of the first membrane and a retentate mixture on the first side of the first membrane, wherein the permeate mixture is enriched in the volatile compound, and the retentate mixture is depleted in the volatile compound.

13 Claims, 2 Drawing Sheets

(51) Int. Cl.
  *B01D 63/02* (2006.01)
  *B01D 69/02* (2006.01)
  *B01D 71/70* (2006.01)
  *C08J 3/03* (2006.01)

(52) U.S. Cl.
  CPC ............ *B01D 69/02* (2013.01); *B01D 71/70* (2013.01); *C08J 3/03* (2013.01); *B01D 2311/06* (2013.01); *B01D 2311/13* (2013.01); *B01D 2325/38* (2013.01); *C08J 2383/04* (2013.01)

(56) References Cited

U.S. PATENT DOCUMENTS

| | | | |
|---|---|---|---|
| 6,075,073 A * | 6/2000 | McGlothlin | C08J 3/07 210/637 |
| 6,545,086 B1 | 4/2003 | Kosal | |
| 6,793,825 B2 | 9/2004 | Maass et al. | |
| 7,365,220 B2 * | 4/2008 | Lewis | C07F 7/025 556/482 |
| 9,962,657 B2 * | 5/2018 | Ahn | B01D 61/362 |
| 2002/0158020 A1 * | 10/2002 | Maass | B01D 61/246 210/650 |
| 2002/0165505 A1 | 11/2002 | Gee et al. | |
| 2003/0065086 A1 * | 4/2003 | Kosal | C08J 3/03 524/588 |
| 2008/0210540 A1 * | 9/2008 | Dieterle | B01D 3/14 203/19 |
| 2015/0190747 A1 * | 7/2015 | Ahn | B01D 53/1475 95/46 |
| 2017/0021307 A1 | 1/2017 | Ahn et al. | |

\* cited by examiner

METHOD OF REMOVING VOLATILE COMPOUNDS FROM EMULSIONS

This application is a U.S. national stage filing under 35 U.S.C. § 371 of PCT Application No. PCT/US16/53227 filed on 23 Sep. 2016, which claims the benefit of U.S. Provisional Patent Application No. 62/232,121 filed 24 Sep. 2015 under 35 U.S.C. § 119 (e). PCT Application No. PCT/US16/53227 and U.S. Provisional Patent Application No. 62/232,121 are hereby incorporated by reference.

BACKGROUND OF THE INVENTION

Summary of the Invention

In various embodiments, the present invention provides methods of removing a volatile compound from a liquid mixture comprising an emulsion.

In one embodiment, the present invention provides methods of separating a volatile compound from a liquid feed mixture comprising an emulsion, the method comprising:
  contacting a first side of a first membrane with the liquid feed mixture comprising the emulsion having at least one volatile compound; and
  contacting a second side of the first membrane with a sweep medium comprising a sweep fluid, to produce a permeate mixture on the second side of the first membrane and a retentate mixture comprising the emulsion on the first side of the first membrane, wherein the permeate mixture is enriched in the volatile compound, and the retentate mixture is depleted in the volatile compound.

In another embodiment, the present invention provides methods of separating a volatile compound from a liquid feed mixture comprising an emulsion, the method comprising:
  contacting a first side of a first membrane with a liquid feed mixture comprising an emulsion having a polymer, and at least one volatile compound, the first membrane comprises a dense silicone membrane having a thickness of about 1 µm to about 300 µm, and the emulsion has a temperature of about 0° C. to about 200° C.; and
  contacting a second side of the membrane with a sweep medium comprising a sweep liquid to produce a permeate mixture on the second side of the first membrane and a retentate mixture comprising the emulsion on the first side of the membrane, wherein the permeate mixture is enriched in the volatile compound, and the retentate mixture is depleted in the volatile compound by 1 wt % to about 99.99 wt %, as compared to the liquid feed mixture.

In another embodiment, the present invention provides systems for separating a volatile compound from a liquid mixture comprising an emulsion, the system comprising:
  a first membrane;
  a liquid feed mixture comprising an emulsion having a polymer, and at least one volatile compound, the liquid feed mixture contacting a first side of the first membrane;
  a sweep medium comprising at least one sweep liquid, the sweep medium contacting a second side of the first membrane;
  a permeate mixture on the second side of the first membrane, wherein the permeate mixture is enriched in the volatile compound;
  a retentate mixture on the first side of the first membrane, wherein the retentate mixture is depleted in the volatile compound,
  wherein the permeate mixture and retentate mixture are formed by the contacting of the sweep medium of the second side of the first membrane and the contacting of the liquid feed mixture of the first side of the first membrane.

The emulsion may comprise a polymer selected from an organic polymer or organopolysiloxane polymer, and volatile compound may comprise a volatile organic compound, a volatile inorganic compound, a volatile siloxane, a volatile linear siloxane, and/or a volatile cyclicsiloxane.

BRIEF DESCRIPTION OF THE FIGURES

The drawings illustrate generally, by way of example, but not by way of limitation, various embodiments discussed in the present document.

DETAILED DESCRIPTION OF THE INVENTION

Figure 1:
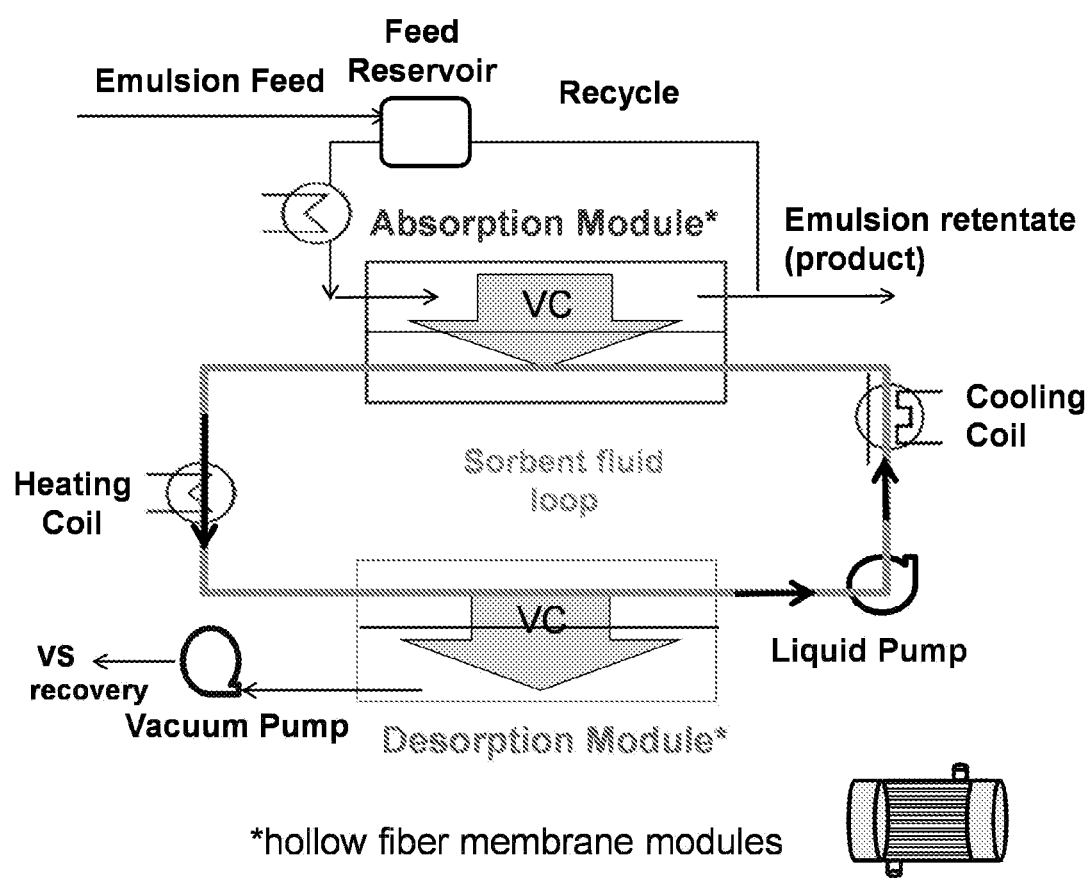
FIG. 1 illustrates a system for separating a volatile compound from an emulsion wherein the system comprises a desorption module that comprises a hollow fiber membrane module. VC means volatile compound.

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

The methods and processes of the present invention may also help to remove or reduce undesirable odors and other unwanted compounds in addition to volatile compound.

Various embodiments provide certain advantages over other separation methods, some of which are surprising and unexpected. The sweep medium, such as a fluid or liquid, can provide enhanced flux of the volatile compound desired to be separated through a membrane. In various embodiments, the methods of the present invention can be utilized to efficiently remove volatile siloxanes, including cyclosiloxanes and linear siloxanes, from a liquid feed mixture comprising an emulsion. Compared to conventional methods of stripping volatile compounds, such as volatile siloxanes, the present methods and systems can be carried out under relatively mild conditions by controlling such parameters as module temperature, feed pressure, permeate pressure, sweep medium temperature, sweep medium flow rate, feed mixture temperature, and feed mixture flow rate. This causes less degradation or destabilization of the mixture and loss of desired components than other methods that include harsher temperatures and vacuum techniques. Use of vacuum, even with a membrane, tends to be poorly selective in removing volatiles components, and results in thickening or destabilization of the emulsion due to the concurrent loss of water. Vacuum also can introduce significant equipment, operating and maintenance costs.

In some embodiments, by using a nonporous or dense membrane, less leakage of the emulsion and/or a sweep medium occurs, less clogging of the membrane can occur, and less capillary condensation can occur as compared to porous or microporous membranes having pores passing all the way through the membrane. Thus, the present methods provide a clog and leak resistant membrane system requiring less maintenance and having superior separation abilities including greater efficiency and greater degree of separation.

In various embodiments, the small footprint and modularity of the membrane process affords greater volumetric efficiency, energy efficiency or reliability than batch operations such as pot stripping, rotary evaporators, steam strippers, and continuous or semi-continuous operations such as wiped film evaporators that require more moving parts. In some embodiments, by using a dense unsupported membrane, the absence of pores in a porous support contributes to less fouling and less mass transfer resistance from condensation of absorbates in the pores of the support.

In various embodiments, the methods and systems of the present invention can remove volatile compounds from a mixture at least one of under more mild processing conditions, more safely, more reliably and more efficiently than other processes, for example, using less energy, using less time, less extreme temperature and pressure ranges that may cause degradation, or with lower cost, or with greater separation selectivity of volatile compounds relative to other components such as water. In various embodiments the methods and systems of the present invention can further remove other impurities, such as residual solvents and odors.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

In the methods of manufacturing described herein, the steps can be carried out in any order without departing from the principles of the invention, except when a temporal or operational sequence is explicitly recited. Furthermore, specified steps can be carried out concurrently unless explicit claim language recites that they be carried out separately. For example, a claimed step of doing X and a claimed step of doing Y can be conducted simultaneously within a single operation, and the resulting process will fall within the literal scope of the claimed process.

Selected substituents within the compounds described herein are present to a recursive degree. In this context, "recursive substituent" means that a substituent may recite another instance of itself or of another substituent that itself recites the first substituent. Recursive substituents are an intended aspect of the disclosed subject matter. Because of the recursive nature of such substituents, theoretically, a large number may be present in any given claim. One of ordinary skill in the art of organic chemistry understands that the total number of such substituents is reasonably limited by the desired properties of the compound intended. Such properties include, by way of example and not limitation, physical properties such as molecular weight, solubility, and practical properties such as ease of synthesis. Recursive substituents can call back on themselves any suitable number of times, such as about 1 time, about 2 times, 3, 4, 5, 6, 7, 8, 9, 10, 15, 20, 30, 50, 100, 200, 300, 400, 500, 750, 1000, 1500, 2000, 3000, 4000, 5000, 10,000, 15,000, 20,000, 30,000, 50,000, 100,000, 200,000, 500,000, 750,000, or about 1,000,000 times or more.

Numerical values or ranges include a degree of variability in the value or range. For example, variability is within 10%, within 5%, or within 1% of a stated value or of a stated limit of a range. When used, the term "about" means a degree of variability in the value or range as described above.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more.

The term "organic group" as used herein refers to but is not limited to any carbon-containing functional group. For example, an oxygen-containing group such as an alkoxy group, aryloxy group, aralkyloxy group, oxo(carbonyl) group, a carboxyl group including a carboxylic acid, carboxylate, and a carboxylate ester; a sulfur-containing group such as an alkyl and aryl sulfide group; and other heteroatom-containing groups. Non-limiting examples of organic groups include OR, OOR, OC(O)N(R)$_2$, CN, CF$_3$, OCF$_3$, R, C(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C (O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R) N(R)C(O)R, N(R)N(R)C(O)OR, N(R)N(R)CON(R)$_2$, N(R) SO$_2$R, N(R)SO$_2$N(R)$_2$, N(R)C(O)OR, N(R)C(O)R, N(R)C (S)R, N(R)C(O)N(R)$_2$, N(R)C(S)N(R)$_2$, N(COR)COR, N(OR)R, C(=NH)N(R)$_2$, C(O)N(OR)R, or C(=NOR)R, wherein R can be hydrogen (in examples that include other carbon atoms) or a carbon-based moiety, and wherein the carbon-based moiety can itself be further substituted.

The term "substituted" as used herein refers to an organic group as defined herein or molecule in which one or more hydrogen atoms contained therein are replaced by one or more non-hydrogen atoms. The term "functional group" or "substituent" as used herein refers to a group that can be or is substituted onto a molecule or onto an organic group. Examples of substituents or functional groups include, but are not limited to, a halogen (e.g., F, Cl, Br, and I); an oxygen atom in groups such as hydroxyl groups, alkoxy groups, aryloxy groups, aralkyloxy groups, oxo(carbonyl) groups, carboxyl groups including carboxylic acids, carboxylates, and carboxylate esters; a sulfur atom in groups such as thiol groups, alkyl and aryl sulfide groups, sulfoxide groups, sulfone groups, sulfonyl groups, and sulfonamide groups; a nitrogen atom in groups such as amines, hydroxylamines, nitriles, nitro groups, N-oxides, hydrazides, azides, and enamines; and other heteroatoms in various other groups. Non-limiting examples of substituents J that can be bonded to a substituted carbon (or other) atom include F, Cl, Br, I, OR, OC(O)N(R)$_2$, CN, NO, NO$_2$, ONO$_2$, azido, CF$_3$, OCF$_3$, R, O (oxo), S (thiono), C(O), S(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, or C(=NOR)R, wherein R can be hydrogen or a carbon-based moiety, and wherein the carbon-based moiety can itself be further substituted; for example, wherein R can be hydrogen, alkyl, acyl, cycloalkyl, aryl, aralkyl, heterocyclyl, heteroaryl, or heteroarylalkyl, wherein any alkyl, acyl, cycloalkyl, aryl, aralkyl, heterocyclyl, heteroaryl, or heteroarylalkyl or R can be independently mono- or multi-substituted with J; or wherein two R groups bonded to a nitrogen atom or to adjacent nitrogen atoms can together with the nitrogen atom or atoms form a heterocyclyl, which can be mono- or independently multi-substituted with J.

The term "alkyl" as used herein refers to straight chain and branched alkyl groups and cycloalkyl groups having from 1 to 40 carbon atoms, 1 to about 20 carbon atoms, 1 to 12 carbons or, in some embodiments, from 1 to 8 carbon atoms. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, t-butyl, neopentyl, isopentyl, and 2,2-dimethylpropyl groups. As used herein, the term "alkyl" encompasses n-alkyl, isoalkyl, and anteisoalkyl groups as well as other branched chain forms of alkyl. Representative substituted alkyl groups can be substituted one or more times with any of the groups listed herein, for example, amino, hydroxy, cyano, carboxy, nitro, thio, alkoxy, and halogen groups.

The term "alkenyl" as used herein refers to straight and branched chain and cyclic alkyl groups as defined herein, except that at least one double bond exists between two carbon atoms. Thus, alkenyl groups have from 2 to 40 carbon atoms, or 2 to about 20 carbon atoms, or 2 to 12 carbons or, in some embodiments, from 2 to 8 carbon atoms. Examples include, but are not limited to vinyl, —CH=CH(CH$_3$), —CH=C(CH$_3$)$_2$, —C(CH$_3$)=CH$_2$, —C(CH$_3$)=CH(CH$_3$), —C(CH$_2$CH$_3$)=CH$_2$, cyclohexenyl, cyclopentenyl, cyclohexadienyl, butadienyl, pentadienyl, and hexadienyl among others.

The term "resin" as used herein refers to polysiloxane material of any viscosity that includes at least one siloxane monomer that is bonded via a Si—O—Si bond to three or four other siloxane monomers. In one example, the polysiloxane material includes T or Q groups, as defined herein.

The term "radiation" as used herein refers to energetic particles travelling through a medium or space. Examples of radiation are visible light, infrared light, microwaves, radio waves, very low frequency waves, extremely low frequency waves, thermal radiation (heat), and black-body radiation.

The term "cure" as used herein refers to exposing to radiation in any form, heating, or allowing to undergo a physical or chemical reaction that results in hardening or an increase in viscosity.

The term "dense" as used herein with regard to membranes refers to gas or liquid components sorbing into the membrane at the upstream side, diffusing through the membrane, and desorbing at the downstream side by means, for example, of a solution-diffusion mechanism. Alternatively, the term refers to a membrane that has at least one layer that prevents direct contact of liquid components from the first side of the membrane with components (liquid or gas) on the second side of the membrane. A dense membrane can be substantially nonporous.

The term "pore" as used herein refers to a depression, slit, or hole of any size or shape in a solid object. A pore can run all the way through an object. A pore can intersect other pores.

The term "nonporous" as used herein with regard to membranes refers to the membrane having substantially no pores that form paths that penetrate all the way through the thickness of the membrane from one major side to the other major side, unless otherwise indicated.

The term "free-standing" or "unsupported" as used herein refers to a membrane with the majority of the surface area on each of the two major sides of the membrane not contacting a substrate, whether the substrate is porous or not. In some embodiments, a membrane that is "free-standing" or "unsupported" can be 100% not supported on both major sides. A membrane that is "free-standing" or "unsupported" can be supported at the edges or at the minority (e.g., less than about 50%) of the surface area on either or both major sides of the membrane.

The term "supported" as used herein refers to a membrane with the majority of the surface area on at least one of the two major sides contacting a substrate, whether the substrate is porous or not. In some embodiments, a membrane that is "supported" can be 100% supported on at least one side. A membrane that is "supported" can be supported at any suitable location at the majority (e.g., more than about 50%) of the surface area on either or both major sides of the membrane.

The term "enrich" as used herein refers to increasing in quantity or concentration, such as of a liquid, gas, or solute. For example, a mixture of gases A and B can be enriched in gas A if the concentration or quantity of gas A is increased, for example by selective permeation of gas A through a membrane to add gas A to the mixture, or for example by selective permeation of gas B through a membrane to take gas B away from the mixture. When a first gas component moves across a membrane into a fluid on the other side, the fluid is enriched in the first gas component, and the combination of the fluid and the gas that permeated the membrane can be referred to as the permeate.

The term "deplete" as used herein refers to decreasing in quantity or concentration, such as of a liquid, gas, or solute. For example, a mixture of gases A and B can be depleted in gas B if the concentration or quantity of gas B is decreased, for example by selective permeation of gas B through a membrane to take gas B away from the mixture, or for example by selective permeation of gas A through a membrane to add gas A to the mixture.

The term "selectivity" or "ideal selectivity" as used herein refers to the ratio of permeability of the faster permeating gas or vapor over the slower permeating gas or vapor, measured at the same temperature (assumed to be room temperature unless otherwise specified).

The term "permeability" as used herein refers to the permeability coefficient ($P_x$) of substance X through a membrane, where $q_{mx}=P_x*A*\Delta p_x*(1/\delta)$, where $q_{mx}$ is the volumetric flow rate of substance X through the membrane, A is the surface area of one major side of the membrane through which substance X flows, $\Delta p_x$ is the difference of the partial pressure of substance X across the membrane, and $\delta$ is the thickness of the membrane. $P_x$ can also be expressed as $V \cdot \delta/(A \cdot t \cdot \Delta p)$, wherein $P_x$ is the permeability for a gas X in the membrane, V is the volume of gas X which permeates through the membrane, $\delta$ is the thickness of the membrane, A is the area of the membrane, t is time, $\Delta p$ is the pressure difference of the gas X at the retente and permeate side.

The term "Barrer" or "Barrers" as used herein refers to a unit of permeability, wherein 1 Barrer=$10^{-11}$ (cm³ gas) cm cm$^{-2}$ s$^{-1}$ mmHg$^{-1}$, or $10^{-10}$ (cm³ gas) cm cm$^{-2}$ s$^{-1}$ cm Hg$^{-1}$, where "cm³ gas" represents the quantity of the gas that would take up one cubic centimeter at standard temperature and pressure.

The term "total surface area" as used herein with respect to membranes refers to the total surface area of the membrane separating the first and second sides. In a hollow fiber membrane, the total surface area is nominally defined by n*□*OD*I where n is the total number of fibers in a membrane module, OD is the outer diameter of the fiber and I is the active length of the fiber that is in contact with the the liquid feed mixture comprising the emulsion having at least one volatile compound on the first side and the sweep medium on the second side.

The term "air" as used herein refers to a mixture of gases with a composition approximately identical to the native composition of gases taken from the atmosphere, generally at ground level. In some examples, air is taken from the ambient surroundings. Air has a composition that includes approximately 78% nitrogen, 21% oxygen, 1% argon, and 0.04% carbon dioxide, as well as small amounts of other gases.

The term "room temperature" as used herein refers to ambient temperature, which can be, for example, between about 15° C. and about 28° C.

The term "gas" as used herein includes vapor phase materials.

The term "absorption" or "absorb" as used herein refers to dissolving or carrying an absorbed component. For example, a fluid can absorb a gas as at least one of a dissolved gas, and as bubbles of any suitable size such as to allow transport of the gas in the fluid. An absorption process can include any suitable mechanism, such as chemical interactions (e.g., chemisorption), physical interactions (e.g., physisorption), bulk interactions, surface interactions (e.g., adsorption), or combinations thereof.

The term "desorption" or "desorb" as used herein refers to ejecting an absorbed component.

Method of Separating Volatile Compounds from a Liquid Mixture.

Various embodiments provide a method of separating a volatile compound from a liquid mixture comprising an emulsion. The method can include contacting a first side of a first membrane with a liquid feed mixture including a polymer and at least one volatile compound. The method can also include contacting a second side of the membrane with a sweep medium including at least one sweep fluid that may be a sweep gas or a sweep liquid. The contacting of the feed mixture with the first side of the membrane and the contacting of the sweep medium with the second side of the membrane can produce a permeate mixture on the second side of the membrane and a retentate mixture on the first side of the membrane, wherein the permeate mixture is enriched in the volatile compound, and the retentate mixture is depleted in the volatile compound.

In various embodiments, the method provides a more energy efficient, convenient, and mild means to remove volatile compounds, than known methods such as pot stripping and wiped film evaporators. In various embodiments, the method enhances the stability of the emulsion relative to other techniques by reducing the amount of water removed during the process, and eliminates or reduces the need to add water back into the emulsion product. In one embodiment, the membrane is a dense silicone hollow fiber membrane, and the feed fluid is a mixture of an organopolysiloxane polymer with a volatile linear or cyclosiloxanes. In some embodiments, the method can provide effective reduction in the volatile compound at a lower temperature or vacuum level than in a bulk stripping operation. In some embodiments, a sweep medium such as a silicone fluid can be used to sweep the shell-side or bore-side of a hollow fiber membrane module to remove the volatile compound from another liquid. The sweep fluid can then be regenerated for re-use through the use of a second membrane module or membrane-free desorption module. In some embodiments, the volatile compounds can then be desorbed from the sweep fluid using a higher temperature than used during the absorption, optionally without the use of a vacuum pump. In some embodiments including absorption and desorption, the absorption can be performed with at least one of a colder temperature of the sweep fluid and a lower pressure of the sweep fluid, while during desorption at least one of a higher temperature of the sweep fluid and a higher pressure of the sweep fluid is used. In some embodiments, the sweep fluid is recirculated for reabsorption without being desorbed (e.g., multiple passes). In some embodiments, the sweep fluid containing the sorbed volatile compounds is not regenerated but sent to another process or stored for future use. In some embodiments, the method can be used to strip ring-opening equilibration products, ring-opening non-equilibrium products, hydrosilylation products, free radical polymerization products, linear addition products, condensation products, hydrolysis products, (bulk polymerization, solution polymerization, heterophase polymerization including emulsions and dispersion polymerization) products or can be used to recover cyclosiloxanes or other volatile oligosiloxanes from a variety of wastestreams. In some embodiments, the method provides a greater selectivity of volatile siloxanes over other emulsion components, for example water or water vapor, relative to other techniques such as vacuum stripping and evaporation via a wiped film evaporator.

A module can mean any apparatus, including a membrane, in desorption processes and equipment such as falling film evaporators, distillation columns, spray towers, membranes, and can comprise the use of heat, vacuum, or gas sweeps to regenerate the sweep fluid.

In the embodiments where the sweep fluid is regenerated through a membrane-free desorption module, the desorption module can utilize any variety of methods and devices, including combinations thereof, known for regeneration, desorption, or stripping of a solute from a fluid. For example, in the embodiments where the sweep fluid is a liquid, any suitable method of direct contacting can be used to contact the liquid sweep fluid with a desorbing medium. For example, direct contacting can include flowing a gas over the absorbent fluid or bubbling directly into the absorbent fluid. For example, the contacting can include contacting in a packed bed column or tower with any appropriate packing material (for example, random or structured packing or other packing material), a trayed tower column or tower with any appropriate tray type such as a sieve tray, valve tray, or bubble cap tray with any appropriate tray spacing and feed stream positions, a distillation column or tower with any appropriate tray type such as a sieve tray, valve tray, or bubble cap tray with any appropriate tray spacing and feed stream positions, a liquid spray column or tower with any appropriate packing material, for example random or structured packing or other packing material, a centrifugal contactor, a rotating surface such as a wheel or tray, a falling film device that features one or more immobile surfaces that permits gas contact with a falling thin film of liquid, across a porous polymeric or inorganic membrane, or any combination thereof. In the cases where the sweep fluid is a gas or vapor, the regeneration can include a condenser, a cold trap, solid sorbents, or any other vapor recovery process, including combinations thereof, to selectively reduce the level of the of the one or more volatile compounds in the sweep fluid to render it sufficiently sorptive for re-use or discarding.

The method can separate one or more than one volatile compound from the liquid feed mixture. The removal can include decreasing the concentration of a volatile compound in the feed mixture, or the removal can include the removal of substantially all of a volatile compound from the feed mixture. In some embodiments, substantially all of one volatile compound is removed, while only part of another volatile compound is removed. In some embodiments, the concentration of one volatile compound can be decreased by a first amount, while the concentration of another volatile compound can be decreased by a second amount that is the same or different than the first amount. The method can remove any suitable amount of the one or more volatile compounds from the feed mixture.

In some embodiments, the retentate mixture is depleted in the one or more volatile compounds by more than 99.99 wt %, or by 100% (within experimental detection limits). That is, less than 0.01 wt % of the volatile compounds remain in the feed mixture or emulsion. In some embodiments, the retentate mixture is depleted in one or more volatile siloxanes by more than 99.99 wt % so that less than 0.01 wt % of the volatile siloxanes, or less than the detectable limit of the volatile siloxanes, remain in the feed mixture or emulsion. In some embodiments, the retentate mixture is depleted in the one or more volatile siloxanes by about 1 wt % to about 99.99 wt %, as compared to the liquid feed mixture, about 40 wt % to about 99 wt %, about 70 wt % to about 95 wt %, or about 1 wt % or less, 2 wt %, 3, 4, 5, 10, 15, 20, 25, 30, 35, 40, 45, 50, 55, 60, 65, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 99.5 wt %, or about 99.99 wt % or more.

The present invention provides methods of using a membrane in combination with a sweep medium. The sweep medium can be contacted to the permeate side of a membrane to help sweep away some or substantially all of one or more volatile compounds that permeate through the membrane into the permeate side, thus helping maintain a strong driving force for mass transfer of volatile compounds across the membrane. The liquid feed mixture on one side of the membrane and the sweep medium on the other side of the membrane can have any suitable flow configuration with respect to one another. The movement of the feed mixture and sweep medium with respect to one another can lessen the concentration of the volatile compound immediately adjacent the membrane, which can increase the rate of transfer of the volatile compound across the membrane. By moving the feed mixture and sweep medium with respect to one another, the amount of the feed mixture and sweep medium contacting the membrane over a given time can be increased or maximized, which can improve the separation performance of the membrane by increasing or optimizing the transfer of the volatile compound across the membrane. In some examples, the feed mixture and sweep medium flow in similar directions. In other examples, the feed mixture and sweep medium flow in at least one of countercurrent or crosscurrent flow. Flow configurations can include multiple flow patterns, for example about 10, 20 30, 40, 50, 60, 70, 80, or 90% of the feed mixture and sweep medium can have a crosscurrent flow while the other about 90, 80, 70, 60, 50, 40, 30, 20, or 10% of the feed mixture and sweep medium have a countercurrent flow, a similar flow direction (e.g., co-current flow), or a radial flow direction with respect to one another (e.g., bore flow along length while sweep flow is along a radial direction). Any suitable combination of flow patterns is encompassed within embodiments of the present invention. The flow rate of the feed mixture on one side of a membrane, and the flow rate of the sweep medium on the other side of the membrane can be varied independently to give any suitable feed mixture to sweep medium flow ratio for a membrane system. There can be an optimum range of feed mixture to sweep medium flow ratios to accomplish a desired separation for a given membrane system, configuration and operating conditions. When a sweep liquid is used to assist in removal of a volatile compound from a feed mixture, the optimal feed mixture to sweep liquid flow ratio can be different from the optimal ratio for a process where the volatile compound is removed from the feed mixture into a sweep medium.

The feed mixture can be contacted to the membrane (e.g., one or more membranes) in any suitable fashion. In some embodiments, the feed mixture can be allowed to contact the membrane at a pressure such that there is a positive gradient in partial pressure of the at least one volatile compound across the membrane to drive the permeation of the at least one volatile compound into the permeate side of the membrane. In one example, the feed mixture is allowed to contact the membrane at approximately ambient pressure. In another example, both the feed mixture/retentate side and the permeate side are kept near ambient pressure, but a sweep fluid or gas introduced to the permeate side has a pressure and flow rate such that a positive partial pressure gradient of the volatile compound is maintained. In another example, the feed mixture is allowed to contact the membrane such that a pressure difference between the first and second sides of the membrane occurs. The pressure difference can be such that the pressure of the feed mixture (on the first side of the membrane) is greater than the pressure at the second side of the membrane. In one example, the pressure difference is caused by the pressure of the feed mixture being at above ambient pressure; in such examples, the pressure of the feed mixture can be raised above ambient pressure using any suitable means, such as with a pump. In another example, the pressure difference is caused by the pressure at the second side of the membrane being at or below ambient pressure; in such examples, the pressure of the second side of the membrane can be reduced below ambient pressure using any suitable device such as a blower or vacuum pump. In other examples, a combination of lower than ambient pressure at the second side of the membrane, and higher than ambient pressure at the first side of the membrane, contributes to the pressure difference across the membrane. In some embodiments, a higher than ambient pressure on the first side of the membrane can be achieved by pumping feed mixture to the first side of the membrane and restricting the exit pathway of the retentate mixture from the membrane.

The method for separating one or more volatile compounds from a feed mixture includes contacting a second side of the membrane with a sweep medium. The contacting of the second side of the membrane with the sweep medium and the first side of the membrane with the feed mixture produces a permeate mixture on the second side of the membrane and a retentate mixture on the first side of the membrane. The permeate mixture is enriched in the volatile compound; the sweep medium has at least one of a higher concentration or a greater quantity of the volatile compound therein after being contacted with the membrane as compared to the concentration before being contacted with the membrane. The retentate mixture is depleted in the volatile compound; the feed mixture has at least one of a lower concentration or a smaller quantity of the volatile compound therein after being contacted with the membrane as compared to the concentration or quantity of the volatile compound before being contacted with the membrane (as the feed mixture).

In some embodiments, the temperature of the feed mixture can be adjusted to provide a desired degree of separation, depending on the nature of the sweep medium and the membrane. The temperature of the feed mixture can be any suitable temperature, such as about room temperature to about 150° C., about 20° C. to about 120° C., about −40° C. to about 250° C., about 30° C. to about 150° C., about 40° C. to about 110° C., about 50° C. to about 90° C., or about room temperature, or about −40° C. or less, or about −35° C., −30, −25, −20, −15, −10, −5, 0, 5, 10, 15, 20, 25, 30, 35, 40, 45, 50, 55, 60, 65, 70, 75, 78, 80, 83, 85, 90, 93, 95, 100, 105, 110, 115, 120, 125, 130, 135, 140, 145, 150, 155, 160, 170, 180, 190, 200, 210, 220, 230, 240° C., or about 250° C. or more In some embodiments, the sweep medium can be introduced to the second side of the membrane at a favorable temperature and pressure to achieve a more rapid transfer of the one or more volatile compounds from the fluid into the sweep medium, e.g., to increase the flux of the one or more volatile compounds across the membrane. The sweep medium can be any suitable temperature during the contacting, such as about −60° C. to about 150° C., about −30° C. to about 150° C., about −20° C. to about 150° C., about −10° C. to about 150° C., about 0° C. to about 150° C., about 10° C. to about 150° C., about 20° C. to about 150° C., about 10° C. to about 110° C., about 20° C. to about 100° C., about 10° C. to about 90° C., or about −60° C. or less, or about −55° C., −50, −45, −40, −35, −30, −25, −20, −15, −10, −5, 0, 5, 10, 15, 20, 25, 30, 40, 50, 55, 60, 65, 70, 75, 80, 85, 90, 95, 100, 105, 110, 115, 120, 125, 130, 135, 140, 145° C., or about 150° C. or more.

The feed mixture can have any suitable pressure during the contacting with the first side of the membrane. For example, the pressure of the feed mixture can be 0.01 bar to about 100,000 bar, or about 0.5 bar to about 5 bar, or about 0.01 bar or less, 0.05, 0.1, 0.2, 0.4, 0.6, 0.8, 1.0, 1.2, 1.4, 1.6, 1.8, 2, 2.5, 3, 3.5, 4, 4.5, 5, 6, 7, 8, 9, 10, 12, 14, 16, 18, 20, 25, 30, 40, 50, 75, 100, 150, 200, 250, 500, 750, 1,000, 1,500, 2,500, 5,000, 10,000, 50,000, or about 100,000 bar or more. The sweep medium can have any suitable pressure during the contacting with the first side of the membrane. For example, the pressure of the sweep medium can be about 0.000,01 bar to about 100 bar, or about 0.001 bar to about 10 bar, or about 0.000,01 bar or less, about 0.000,1 bar, 0.001, 0.01, 0.1, 0.2, 0.4, 0.6, 0.8, 1.0, 1.2, 1.4, 1.6, 1.8, 2, 2.5, 3, 3.5, 4, 4.5, 5, 6, 7, 8, 9, 10, 12, 14, 16, 18, 20, 25, 30, 40, 50, 75, or about 100 bar or more. The pressure differential between the feed mixture and the sweep medium can be any suitable pressure differential, such that the method can be carried out as described herein. For example, the pressure differential between the feed mixture and the sweep medium can be about 0, about 0.000,01 bar to about 100,000 bar, or about 0.01 bar to about 10,000 bar, or about 0.000,01 bar or less, about 0.000,1 bar, 0.001, 0.01, 0.1, 0.2, 0.4, 0.6, 0.8, 1.0, 1.2, 1.4, 1.6, 1.8, 2, 2.5, 3, 3.5, 4, 4.5, 5, 6, 7, 8, 9, 10, 12, 14, 16, 18, 20, 25, 30, 40, 50, 75, 100, 150, 200, 250, 500, 750, 1,000, 1,500, 2,500, 5,000, 10,000, 50,000, or about 100,000 bar or more.

In some examples, if the concentration of the volatile compound component at the second side of the membrane is allowed to reach certain levels, the rate of separation of the volatile compound component from the feed mixture can be decreased. The flow rate of the feed mixture and the sweep medium can be adjusted such that efficient and effective separation of the one or more volatile compounds occurs. For example, the flow rate of the feed mixture can be about 0.001 L/min to about 100,000 L/min, about 0.1 L/min to about 100 L/min, or about 0.001 L/min or less, 0.01 L/min, 0.1, 1, 2, 4, 6, 8, 10, 15, 20, 25, 50, 75, 100, 150, 200, 250, 500, 750, 1,000, 1,500, 2,500, 5,000, 7,500, 10,000, 15,000, 20,000, 25,000, 50,000, 75,000, or about 100,000 L/min or more. The flow rate of the sweep medium can be 0.001 L/min to about 100,000 L/min, about 0.1 L/min to about 100 L/min, or about 0.001 L/min or less, 0.01 L/min, 0.1, 1, 2, 4, 6, 8, 10, 15, 20, 25, 50, 75, 100, 150, 200, 250, 500, 750, 1,000, 1,500, 2,500, 5,000, 7,500, 10,000, 15,000, 20,000, 25,000, 50,000, 75,000, or about 100,000 L/min or more.

In some embodiments, the method for removing a volatile compound from a feed mixture can also include removing the one or more volatile compounds from the permeate mixture provided by the contacting, by at least one of decreasing the concentration or quantity of the one or more volatile compounds in the permeate mixture. Thus, the present invention can provide a combination of removing at least one volatile compound from a feed mixture using a sweep medium and removing the at least one volatile compound from the used sweep medium such as by use of a second membrane or via another suitable means. The method can further include recirculating the restored sweep medium permeate into contact with the second side of the membrane, allowing reuse of the sweep medium, such as by recirculating the desorbed permeate mixture into contact with the second side of the first membrane. Such reuse can enhance efficiency of the separation of the one or more volatile compound from the feed mixture, and can occur for multiple cycles (e.g., about 2, 3, 4, 5, 10, 100, 1000, or more cycles). Desorbing the one or more volatile compounds can include contacting a first side of a second membrane with the permeate mixture and contacting a second side of the second membrane with a sweep medium. The sweep medium used in the second process can be the same as or different from the sweep medium used in the first process. In some embodiments, the sweep medium is not recycled.

Feed Mixture and Volatile Compound.

The liquid feed mixture can be any suitable feed mixture that at least includes at least one volatile compound and an emulsion. The emulsion may comprise at least one polymer. The feed mixture can be a composition formed by a one or more chemical reactions that form the emulsion having the polymer, wherein at least one of the one or more volatile compounds are desired products or wherein at least one of the one or more volatile compounds are side-products. The polymer can be any suitable polymer, such as an organic polymer or a polymer including silicon, such as a polysiloxane, such as an organopolysiloxane. The polymer can be any polymer including silicone described herein.

The emulsion may be any type of emulsion. For example, the emulsion may be a water-in-oil, oil-in-water, water-in-oil-in water, or oil-in-water-in-oil emulsion.

In one embodiment, the emulsion is a water continuous organic emulsion. In this embodiment, the dispersed phase in the emulsion contains at least one organic oil.

In a further embodiment, the organic emulsion may be selected from a latex. Representative, non-limiting suitable synthetic organic latices include; styrene, styrene-butadiene, styrene-acrylate, acrylonitrile, acrylonitrile-butadiene, acrylics, polyvinyl acetate, polyacrylate, polyurethane, epoxy, alkyd. Representative, non-limiting examples of commercially available lattices useful as the water continuous emulsion in the present process includes the series of lattices sold by BASF under the tradename Joncryl®, such as Joncryl® 77 (BASF).

In another embodiment, the organic emulsion is an emulsion of a natural oil, such as pine oil. A representative, non-limiting examples of commercially available natural oil emulsions useful as the water continuous emulsion in the present process includes; Pinesol®. The organic emulsion may also be an emulsion of wax, such as Michem® Wax Emulsion. The organic emulsion may also be a PTFE dispersion.

In another embodiment, the emulsion may include one or more organopolysiloxanes. The organopolysiloxane can have a linear, branched, cyclic, or resinous structure. The organopolysiloxane can be a homopolymer or a copolymer. The organopolysiloxane compound can be a disiloxane, trisiloxane, or polysiloxane. In some embodiments, the polymer is an alkyl-substituted, aryl-substituted, haloalkyl substituted, haloaryl-substituted or H-substituted organopolysiloxane, such as polydimethylsiloxane, polymethylhydridosiloxane, polymethylvinylsiloxane, polymethylphenylsiloxane, polydiphenylsiloxane, and copolymers thereof. The organopolysiloxane can be substituted with any suitable organic functional group or substituent, or with an organic polymer or organic oligomer, such as various structures of silicone-organic copolymers.

In various embodiments, an organopolysiloxane can include a compound of the formula

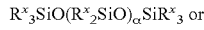

R$^x_3$SiO(R$^x_2$SiO)$_\alpha$SiR$^x_3$ or

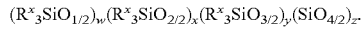

(R$^x_3$SiO$_{1/2}$)$_w$(R$^x_3$SiO$_{2/2}$)$_x$(R$^x_3$SiO$_{3/2}$)$_y$(SiO$_{4/2}$)$_z$.

The variable α can have an average value of about zero or greater, and up to about 1,000,000. 0≤w<0.95, 0≤x<1, 0≤y<1, 0≤z<0.95, and w+x+y+z=1. Each R$^x$ is independently a monovalent functional group, such as —H, substituted or unsubstituted (C$_1$-C$_{20}$)alkyl (e.g., methyl, ethyl, propyl, pentyl, octyl, undecyl, octadecyl), substituted or unsubstituted (C$_6$-C$_{20}$)aryl (e.g., phenyl, tolyl, xylyl, benzyl, 2-phenylethyl), substituted or unsubstituted (C$_2$-C$_{20}$)alkenyl, halogen, (C$_{1-20}$)alkoxy, vinyl, allyl, hexenyl, substituted or unsubstituted (C$_2$-C$_{20}$)alkynyl, halogen-substituted (C$_{1-20}$)alkyl or (C$_6$-C$_{20}$)aryl (e.g., trifluoropropyl), hydroxyl, alkoxy, heteroaryl, substituted and unsubstituted cycloalkyl. Each Rx may also be an organic group, or a group of formula R$^y$-Q, wherein Q comprises an organic group such as carboxy, halogen, substituted or unsubstituted amine (primary, secondary or tertiary), vinyl, allyl, anhydride, mercapto, acrylate, methacrylate, acrylamide, oligoether, polyether, isocyanate, epoxy, cycloepoxy, hydroxyl, halogen, carboxylate, anhydride, isocyanate, sulfide, and naturally occurring or biologically derived groups (e.g., saccharides, peptides, celluloses), an ionic group (e.g., ammonium), cyano(C$_1$-C$_{20}$)alkyl (e.g., cyanoethyl group, a cyanopropyl), and substituted or unsubstituted (C$_1$-C$_{20}$) hydrocarbyl interrupted or terminated with 0, 1, 2, or 3 groups selected from —O—, —NH—, and —S—. The variable R$^y$ is independently a divalent spacer that is a substituted or unsubstituted alkylene group of 1 to 12 carbon atoms or a group of formula (R$^9$O)$_p$, where R$^9$ is a divalent organic group such as an alkylene group of 1 to 12 carbon atoms, subscript p is an integer ranging from 1 to 50, and each R$^9$O may be the same or different. In some examples, R$^y$ is methylene, ethylene, or propylene.

The variable R$^x$ can also each independently include other organic functional groups such as glycidyl, amine, ether, cyanate ester, isocyano, ester, alkoxy, acyloxy, carboxylic acid, carboxylate salt, succinate, anhydride, mercapto, sulfide, ketoxime, azide, phosphonate, phosphine, masked isocyano, hydroxyl, and combinations thereof. The variable R$^x$ can also include cycloalkyl groups including, but not limited to, a cyclohexyl group. The variable R$^x$ can an alkyloxypoly (oxylalkylene) group such as propyloxypoly(oxyethylene), propyloxypoly(oxypropylene), propyloxy-poly(oxypropylene)-co-poly(oxyethylene), halogen substituted versions thereof, and combinations thereof. The variable R$^x$ can include a halogenated hydrocarbon group including, but not limited to, 3,3,3-trifluoropropyl, 3-chloropropyl, dichlorophenyl, and 6,6,6,5,5,4,4,3,3-nonafluorohexyl groups, and combinations thereof. The variable R$^x$ can include carbazole groups such as 3-(N-carbazolyl)propyl, arylamino-functional groups such as 4-(N, N-diphenylamino)phenyl-3-propyl, and halogenated hydrocarbon groups such as 3,3,3-trifluoropropyl, 3-chloropropyl, dichlorophenyl, and 6,6,6, 5,5,4,4,3,3-nonafluorohexyl.

In some examples, the organopolysiloxane can be a dimethylvinyl-terminated dimethyl siloxane, dimethylvinylated and trimethylated silica, tetramethyl tetravinyl cyclotetrasiloxane, dimethylvinylsiloxy-terminated polydimethylsiloxane, trimethylsiloxy-terminated polydimethylsiloxane-polymethylvinylsiloxane copolymer, dimethylvinylsiloxy-terminated polydimethylsiloxane-polymethylvinylsiloxane copolymer, or tetramethyldivinyldisiloxane. In some examples, the vinyl groups of the structures in the preceding list can be substituted with allyl, hexenyl, acrylic, methacrylic or other hydrosilylation-reactive or free-radical polymerizable unsaturated groups, such as acryloxypropyl and methacryloxypropyl groups. In some examples, the organopolysiloxane can include an organopolysiloxane resin including predominantly CH$_2$=CH(CH$_3$)$_2$SiO$_{1/2}$ units, (CH$_3$)$_3$SiO$_{1/2}$ units, and SiO$_{4/2}$ units, or can be PhSi(OSiMe$_2$Vi)$_3$, Si(OSiMe$_2$Vi)$_4$, MeSi(OSiMe$_2$Vi)$_3$, or Ph$_2$Si(OSiMe$_2$Vi)$_2$. In some examples, the organopolysiloxane can include an oligomeric dimethylsiloxane(D)-methylvinylsiloxane(D$^{Vi}$) diol. In some embodiments, the organopolysiloxane can be an organohydrogensiloxane, such as 1,1,3,3-tetramethyldisiloxane, 1,1,3,3-tetraphenyldisiloxane, phenyltris(dimethylsiloxy)silane, 1,3,5-trimethylcyclotrisiloxane, a trimethylsiloxy-terminated poly(methylhydrogensiloxane), a trimethylsiloxy-terminated poly(dimethylsiloxane/methylhydrogensiloxane), a dimethylhydrogensiloxy-terminated poly(methylhydrogensiloxane), a methylhydrogensiloxy-terminated polydimethylsiloxane, or dimethylhydrogensiloxy-terminated poly(dimethylsiloxane/methylhydrogensiloxane).

In another embodiment, the organopolysiloxane includes a compound formed by copolymerizing organic compounds having polymeric backbones with the organopolysiloxane compound such that there is an average of at least one free radical polymerizable group per copolymer. Suitable organic compounds include, but are not limited to, hydrocarbon based polymers such as polyisobutylene, polybutadienes, polyisoprenes, polyolefins such as polyethylene, polypropylene and polyethylene polypropylene copolymers, polystyrenes, styrene butadiene, and acrylonitrile butadiene styrene, polyacrylates, polyethers such as polyethylene oxide and polypropyleneoxide, polyesters such as polyethylene terephthalate and polybutylene terephthalate, polyamides, polycarbonates, polyimides, polyureas, polymethacrylates, partially fluorinated or perfluorinated polymers such as polytetrafluoroethylene, fluorinated rubbers, terminally unsaturated hydrocarbons, olefins, polyolefins, and combinations thereof. The organic compound can also include a copolymer including polymers having multiple organic functionality, multiple organopolysiloxane functionality, and combinations of organopolysiloxanes with the organic compounds. The copolymer may include repeating units in a random, grafted, or blocked arrangement.

In some embodiments, the emulsion may include an organosilane such as diphenylsilane, 2-chloroethylsilane, bis[(p-dimethylsilyl)phenyl]ether, 1,4-dimethyldisilylethane, 1,3,5-tris(dimethylsilyl)benzene, 1,3,5-trimethyl-1,3,5-trisilane, poly(methylsilylene)phenylene, and poly(methylsilylene)methylene.

In some embodiments, the feed mixture comprises the emulsion, wherein the emulsion is present at 0.1 to 99.9 wt %, 90 wt %, 80 wt %, 70 wt %, 60 wt %, 50 wt %, 40 wt %, 30 wt %, 25, 20, 15, 10, 8, 6, 4, 2, 1, 0.5, or 0.1 of the feed mixture.

The liquid feed mixture can be 50 vol % or more liquid, or about 55 vol %, 60, 65, 70, 75, 80, 85, 90, 95, 96, 97, 98, 99, 99.5, 99.9, or about 99.99 vol % liquid, with the remainder gaseous phase. In the feed mixture, the one or more volatile compounds can independently be in a liquid phase, gaseous or vaporous phase, or a combination thereof.

The volatile compound can be any suitable volatile compound including volatile organic compounds, volatile siloxanes, solvents, monomers, oligomers, crosslinkers, odor-causing compounds, air and other entrained gases. Common non-limiting examples of volatile organic compounds include benzene, toluene, xylene, tetrahydrofuran, hydrocarbons (aliphatic, aromatic, saturated, unsaturated, cylic or linear), chloroform, methylene chloride, carbon tetrachloride, triethylamine, hydrogen sulfide, ethyl acetate, monomers such as styrene and its derivatives like a-methyl styrene, vinyl chloride, vinyl fluoride, vinyl acetate, methyl viny ether, acrylonitrile, ethylene, propylene, dienes such as butadiene and hexadiene, isoprene, acrylic monomers such as methyl acrylate, methyl methacrylate, acrylic acid, methacrylic acid, ethyl acrylate, t-butyl acrylate, n-butyl acrylate, 2-ethylhexyl acrylate, cyanoacrylates such as methyl-2-cyanoacrylate, allyl glycidyl ether, ethylene oxide, tetrafluoroethylene, vinylidene fluoride, vinylidene chloride, allyl alcohol, e-caprolactam, phosgene, epichlorohydrin, formaldehyde, tetramethylene oxide, toluene diisocyanate, acrylamides, vinyl butyral, butyric acid, acetylene. In the embodiment where the volatile compound is a siloxane, the volatile siloxane can be any suitable siloxane, such that the method can be performed as described herein, such as any suitable siloxane described herein. For example, the volatile siloxane can be a linear siloxane or cyclosiloxane. A cyclosiloxane can be substituted or unsubstituted and can have about 4-20 —Si—O— units in the one or more polysiloxane rings of the cyclosiloxane. In some embodiments, the cyclosiloxane has a single ring having about 4, 5, 6, 7, 8, 9, 10, 11, 12, or about 13 —Si—O—. In various embodiments, the volatile siloxane can be hexamethyldisiloxane, octamethyltrisiloxane, decamethyltetrasiloxane, dodecamethylpentasiloxane, hexamethylcyclosiloxane (D3), octamethyltetracyclosiloxane (D4), decamethylpentacyclosiloxane (D5), dodecamethylhexacyclosiloxane (D6), and higher oligomers of linear and cyclic polydimethylsiloxanes, or a combination thereof. In some examples, the volatile siloxane can have the formula M-D'$_x$-M, M-D$_x$-D'$_y$-M, M'-D$_x$-M', M'-D$_x$-D'$_y$-M', D$_x$, D$_y$, D'$_x$, or D'$_y$, wherein M represents [O$_{0.5}$Si(Me)$_3$], -D- is [OSi(Me)$_2$], wherein M' or D' denotes a substituted M or D group, wherein the one or more substituents can be any one or more suitable substituents, such as —H, halogen, (C$_1$-C$_{20}$)alkyl, (C$_6$-C$_{20}$)aryl, (C$_2$-C$_{20}$)alkenyl, halogen-substituted (C$_{1-20}$)alkyl or (C$_6$-C$_{20}$)aryl (e.g., trifluoropropyl), substituted or unsubstituted amine, acrylate, methacrylate, oligoether, isocyanate, epoxy, and substituted or unsubstituted (C$_1$-C$_{20}$)hydrocarbyl interrupted or terminated with 0, 1, 2, or 3 groups selected from —O—, —NH—, and —S—, wherein x and y are each independently 1 to about 1,000, about 1 to about 500, or about 1, 2, 3, 4, 5, 6, 8, 10, 12, 14, 16, 18, 20, 25, 30, 35, 40, 45, 50, 60, 70, 80, 90, 100, 120, 140, 160, 180, 200, 250, or about 500 or more.

Sweep Medium.

The method includes contacting a second side of the membrane with a sweep medium. The sweep medium may include a gas, a liquid, or a combination of a gas or liquid. The gas can be any suitable gas, such as ambient air, compressed air, oxygen, nitrogen, helium, or argon. The liquid can be any suitable liquid, such as an aqueous liquid, an organic solvent, or a silicon fluid such as an organosilicon fluid. The sweep fluid can be polar, non-polar or include combinations thereof. In some embodiments, the sweep fluid comprises a hydrophobic fluid.

In some embodiments, the sweep medium includes a fluid that has a higher solubility coefficient for volatile compounds, such as volatile siloxanes, than for water at the conditions of use. In some embodiments, the sweep medium includes a non-polar or hydrophobic fluid. In some embodiments, the sweep medium includes a non-volatile hydrophobic fluid. In some embodiments, the sweep medium may include an ionic liquid, a supercritical fluid or an inorganic salt. In some embodiments, the sweep medium includes an organosilicon fluid. The organosilicon fluid can be at least one of absorbent and adsorbent, e.g., the organosilicon fluid can be a sorbent fluid. The organosilicon fluid can include at least one of an organosiloxane and an organosilane. In some embodiments, the organosilicon fluid is substantially non-volatile and having a modest moderate viscosity, such as 10 to 500 cP at 1 rad/s, to be pumpable and stable at the temperatures of use without using excessive energy to convey the fluid. The sweep fluid can be substantially non-reactive with the volatile compounds being absorbed, and optionally non-reactive with the other components of the feed mixture. The sweep fluid may include mixtures of any the aforementioned sweep fluids. In one embodiment, the sweep fluid is selected from an organosiloxane and an organosilane with the proviso that the sweep liquid comprises less than 10% (w/w), alternatively 0 to 10% (w/w), alternatively less than 5% (w/w), alternatively from 0 to 5% (w/w), alternatively less than 1% (w/w), alternatively from 0 to 1% (w/w), alternatively the sweep liquid is substantially-free of liquid hydrocarbon or other silicon-free organic liquids as measured prior to contacting the second side of the membrane. As used herein, substantially-free, with respect to the amount of liquid hydrocarbon, means containing less than 1% (w/w), alternatively less than 0.5% (w/w), alternatively having no detectable amount of liquid hydrocarbon.

In the embodiments where the sweep fluid is an organic fluid, non-limiting examples of suitable sweep liquids include fluorinated liquids such as perfluorodecalin, fluoro-oligomers, fluoropolymers, glycols, oligomeric glycols, polymeric glycols, and derivatives such as alkoxylated, alkylated and carboxylated of glycols, oligomers glycols and polymeric gycols, ionic liquids, and mixtures thereof. In embodiments where the sweep fluid is an organosilcon fluid, the organosilicon fluid includes at least one organosilicon compound, and can additionally include any other suitable compound, including any suitable organic or inorganic component, including components that do not include silicon, including any suitable solvent or non-solvent. The organosilicon fluid can be, for example, a silane (e.g, an organosilane), a polysilane (e.g., an organopolysilane), a siloxane (e.g., an organosiloxane such as an organomonosiloxane or an organopolysiloxane), or a polysiloxane (e.g., an organopolysiloxane), such as any suitable one of such compound as known in the art. The organosilane can be a monosilane, disilane, trisilane, or polysilane. Similarly, the organosiloxane can be a disiloxane, trisiloxane, or polysiloxane. The structure of the organosilicon compound can be linear, branched, cyclic, or resinous. Cyclosilanes and cyclosiloxanes can have from 3 to 12 silicon atoms, alternatively from 3 to 10 silicon atoms, alternatively from 3 to 4 silicon atoms.

The sweep medium has properties that allow it to absorb the one or more volatile compounds or volatile siloxanes at a suitable rate, and at sufficient quantity, such that a sufficiently efficient separation process occurs. In an embodiment including subsequent desorption of the one or more volatile compounds from the sweep medium, the sweep medium has properties that allow it to desorb the one or more volatile compounds to achieve a suitably low concentration of the one or more volatile compounds in the sweep medium over a suitably short period of time, such that a sufficiently efficient separation process occurs. In an embodiment that includes absorption and desorption from the sweep medium, the sweep medium has properties under the independently chosen process conditions (pressure, temperature, concentrations, flow rates, liquid/gas ratios and membrane areas) that allow it to both absorb and desorb the one or more volatile compounds over suitable lengths of time and in suitably large volumes, such that a sufficiently efficient absorption and desorption occur. While some sweep media, such as liquids including organosilicon fluids, can have the right balance of properties allowing efficient combined absorption and desorption processes, others can be better suited for either absorption or desorption process. In various embodiments, the sweep medium can be advantageously better suited for absorption, desorption, or for absorption/desorption loops, than those used in other methods for separation of a volatile compound from a liquid feed mixture, giving a more energy efficient or cost effective method than the other methods. It will be appreciated that depending on the use for the sweep medium, certain characteristics may be more valuable. For example, in an absorptive process wherein the sweep medium is not recycled, predominantly the absorptive properties of the sweep medium are valuable. In another example, in a combined absorptive/desorptive process wherein the sweep medium is not recycled, in some examples predominantly the desorptive properties of the sweep medium are valuable. However, in a process wherein the sweep medium is recycled, an effective combination of beneficial absorptive properties and desorptive properties is desirable.

In various embodiments, the organosilicon fluid can include an organosilicon (e.g., an organopolysiloxane, an organosiloxane, or an organosilane) having at least one silicon-bonded substituent chosen from substituted or unsubstituted $(C_1-C_{20})$alkyl, methyl, ethyl, propyl, butyl, substituted or unsubstituted $(C_6-C_{20})$aryl, phenyl, substituted or unsubstituted $(C_2-C_{20})$alkynyl, halogen-substituted $(C_{1-20})$alkyl (e.g., trifluoromethyl, trifluoropropyl, nonafluorohexyl) or $(C_6-C_{20})$aryl (e.g., pentafluorophenyl), oligoether, polyether (e.g., poly(oxy$(C_{2-5})$alkylene), and substituted or unsubstituted $(C_1-C_{20})$hydrocarbyl interrupted or terminated with 0, 1, 2, or 3 groups selected from —O—, —NH—, and —S— and optionally free of aliphatic unsaturation. In some embodiments, one or more silicon-bonded substituents are bonded to non-terminal silicon atoms. The absorbent organosilicon fluid can have sufficient functionality such that it can absorb at least some of the first component, such as about 0.1 wt % or less, or about 1 wt %, 2, 3, 4, 5, 10, 20, 30, 40, 50, 60, 70, 80, 90, 95, 96, 97, 98, 99, or about 99.9 wt % or more, such as about 1-99.9999 wt %, 1-40 wt %, 1-20 wt %, 1-10 wt %, 40-99.999 wt %, or about 50-99.99 wt %. An organosilicon compound can contain an average of about 0.001 mole % to about 100 mole % of a non-alkyl or non-methyl silicon-bonded group, such as about 0.001 mole % or less, or about 0.01, 0.1, 0.5, 1, 2, 3, 4, 5, 6, 8, 10, 12, 14, 16, 18, 20, 25, 30, 40, 50, 60, 70, 80, 90, 95, 96, 97, 98, 99, or about 99.9 mole % or more, wherein in an organopolysiloxane, the mole percent of silicon-bonded functional groups is the ratio of the number of moles of siloxane units in the organopolysiloxane having the silicon-bonded group to the total number of moles of siloxane units in the organopolysiloxane, multiplied by 100.

In some embodiments, the absorbent organosilicon fluid can be a substituted or unsubstituted polydi$((C_1-C_{10})$hydrocarbyl)siloxane (wherein each hydrocarbyl is independently selected at each occurrence, and is optionally free of aliphatic unsaturation).

In some embodiments, the organosilicon fluid is an organosilane fluid. In one example, an organosilane can have the formula $R^1_3Si—R^2—SiR^1_3$, wherein $R^1$ is silicon-bonded substituent chosen from substituted or unsubstituted $(C_1-C_{20})$alkyl (e.g., methyl, ethyl, propyl, butyl), substituted or unsubstituted $(C_6-C_{20})$aryl (e.g., phenyl), substituted or unsubstituted $(C_2-C_{20})$alkynyl or $(C_2-C_{20})$alkenyl, halogen-substituted $(C_{1-20})$alkyl (e.g., trifluoromethyl, trifluoropropyl, nonafluorohexyl), halogen-substituted $(C_6-C_{20})$aryl (e.g., pentafluorophenyl), oligoether, polyether (e.g., poly(oxy$(C_{2-5})$alkylene), and substituted or unsubstituted $(C_1-C_{20})$hydrocarbyl interrupted or terminated with 0, 1, 2, or 3 groups selected from —O—, —NH—, and —S— and optionally free of aliphatic unsaturation. The variable $R^2$ can be a hydrocarbylene group free of aliphatic unsaturation having a formula selected from monoaryl such as 1,4-disubstituted phenyl, 1,3-disubstituted phenyl; or bisaryl such as 4,4'-disubstituted-1,1'-biphenyl, 3,3'-disubstituted-1,1'-biphenyl, or similar bisaryl with a hydrocarbon chain including 1 to 6 methylene groups bridging one aryl group to another.

In various embodiments, the organosilicon fluid can include or can be an organosiloxane fluid. In some embodiments, the organosiloxane fluid can include an organopolysiloxane compound. An organopolysiloxane compound can be nonfunctionalized, having only alkyl groups substituted to each siloxy group. An organopolysiloxane compound can be functionalized, having groups other than alkyl groups (e.g., other than methyl groups) substituted to at least one siloxy group, such as silicon-bonded substituent chosen from substituted or unsubstituted $(C_1-C_{20})$alkyl, methyl, ethyl, propyl, butyl, substituted or unsubstituted $(C_6-C_{20})$ aryl, phenyl, substituted or unsubstituted $(C_2-C_{20})$alkynyl, halogen-substituted $(C_{1-20})$alkyl (e.g., trifluoromethyl, trifluoropropyl, nonafluorohexyl) or $(C_6-C_{20})$aryl (e.g., pentafluorophenyl), oligoether, polyether (e.g., poly(oxy($C_{2-5}$)alkylene), and substituted or unsubstituted $(C_1-C_{20})$ hydrocarbyl interrupted or terminated with 0, 1, 2, or 3 groups selected from —O—, —NH—, and —S— and optionally free of aliphatic unsaturation. In some examples, the organopolysiloxane compound has an average of at least one, two, or more than two non-alkyl (e.g., non-methyl) functional groups per molecule. The organopolysiloxane compound can have a linear, branched, cyclic, or resinous structure. The organopolysiloxane compound can be a homopolymer or a copolymer. The organopolysiloxane compound can be a disiloxane, trisiloxane, or polysiloxane. In some embodiments, the organosilicon fluid includes predominantly one or more organopolysiloxanes. In various embodiments, the silicone fluid can include 0.1 wt % or less organopolysiloxane, or 1 wt %, 2, 3, 4, 5, 10, 20, 30, 40, 50, 60, 70, 80, 90, 95, 96, 97, 97, 98, 99, or about 99.9 wt % or more organopolysiloxanes. In some embodiments, the silicone fluid can include about 1-99.9999 wt %, 40-99.999 wt %, or about 60-99.99 wt % organopolysiloxanes.

Examples of absorbent organosilicon fluids can include one or more of a polydimethylsiloxane, polydiethylsiloxane, polymethylphenylsiloxane, polydiphenylsiloxane, tetra-n-butylsilane, pentafluorophenyltrimethylsilane, 1,3-diphenyl-1,1,3,3,-tetramethyldisiloxane, octamethyl-T-8-silsesquioxane, phenyltris(trimethylsiloxy)silane, tetrakis(trimethylsiloxy)silane, 1,1,3,3-tetraphenyldimethyldisiloxane, 1,1,5,5-tetraphenyl-1,3,3,5-tetramethyltrisiloxane, nonafluorohexyltrimethylsilane, trifluoromethyltrimethylsilane, and 3,5,7-triphenylnonamethylpentasiloxane, and copolymers or compatibilized mixtures thereof.

The sweep medium can include one compound or more than one compound. In some embodiments, the sweep medium can include a silicone fluid, an organic oil, a polyether, or halogen-substituted versions thereof. The sweep medium can include one or more organic compounds dissolved or suspended therein, wherein the compounds can be liquid, solid, or gas (e.g., in pure form at standard temperature and pressure). In some embodiments the sweep medium can be pre-charged with a suitable level of the volatile compound component at a level suitable for efficient operation of the absorption process with a desorption or regeneration process. The sweep medium may also optionally contain heat stabilizers, antifoams, rheology modifiers, corrosion inhibitors, acid scavengers, base scavengers, dyes, pigments, surfactants, or a combination thereof, such as to make the solution more amenable to extended use and monitoring.

Different sweep media can have different abilities to absorb certain volatile compounds, with regard to the volume of the volatile compound that can be absorbed, and the concentration of a volatile compound at which the sweep medium begins to become saturated with the volatile compound. As the sweep medium becomes saturated with the particular volatile compound, the rate of absorption can decrease. When the sweep medium is relatively depleted of the particular volatile compound, as compared to the concentration at which saturation begins to occur, the rate of absorption of the volatile compound can be higher. Therefore, to maximize the efficiency of the removal of the one or more volatile compounds from the feed mixture, the sweep medium can be depleted in the one or more volatile compounds (as compared to a saturated or semi-saturated state).

The Membrane.

The membrane can be any suitable membrane or combination of membranes as described further herein. For example, for a method including absorption, or desorption, of a volatile compound to or from a sweep medium, the first membrane, or the second membrane, can be a single membrane, or a bank or array of membranes of any size, shape, or form factor, including a module of hollow fiber membranes. The membrane may be a hydrophobic membrane. The membrane may comprise hydrophilic materials, hydrophobic materials and combinations thereof. The one or more membranes can be selectively permeable to any one or more volatile compounds in the feed mixture. In embodiments including hollow fiber membranes, the fibers can collectively have a bore-side and a shell-side (e.g., such as in a particular hollow fiber membrane module), wherein at least one of 1) the first side of the hollow fiber membrane is the bore-side and the second side of the hollow fiber membrane is the shell-side, and 2) the first side of the hollow fiber membrane is the shell-side and the second side of the hollow fiber membrane is the bore-side.

Embodiments of the membrane can include, but are not limited to, a cured product of a silicone composition, such a cured product of an organopolysiloxane composition. Various methods of curing can be used, including any suitable method of curing, including for example hydrosilylation curing, condensation curing, free-radical curing, amine-epoxy curing, radiation curing, cooling, or any combination thereof. Embodiments of the membrane can include other hydrophobic coatings, such as fluorinated polymers and copolymers and silicone polymers. Embodiments of the membrane can include a selective dense layer supported on a porous support material. Embodiments of the membrane can include a porous support material that is not susceptible to penetration of the liquid phase of the feed or sweep streams.

The method of the present invention includes the use of one or more membranes. One or more of the membranes can be dense membranes. One or more of the membranes can be nonporous. In other embodiments, one or more parts of the membranes, such as the support, may contain pores. Some types of pores can penetrate from one major side of a membrane to another major side, such as cylindrical pores shaped approximately as cylinders, or such as sponge pores, for example pores that include randomly shaped cavities or channels, that form a connection from one major side to the other major side. Some types of pores do not penetrate from one major side of a membrane to another major side, such as blind pores, also referred to as surface pores. Some types of sponge pores can also not penetrate from one major side of the membrane to the other major side. In some embodiments, a dense membrane of the present invention can include substantially no pores, including both pores that penetrate from one major side to the other major side, and including pores that do not penetrate from one major side to the other major side, such as less than about 100,000 pores per mm$^2$, or less than about 10,000, 1000, 100, 50, 25, 20, 15, 10, 5, or less than about 1 pore per mm$^2$. In some embodiments, a dense membrane can include substantially no pores that penetrate from one side to the other, such as less than about 100,000 penetrating pore per mm$^2$, or less than about 10,000, 1000, 100, 50, 25, 20, 15, 10, 5, or less than about 1 penetrating pore per mm$^2$, but the membrane can also include any suitable number of pores that do not penetrate from one major side of the membrane to the other major side of the membrane, such as at least one of surface pores and sponge pores, such as equal to or more than about 100,000 non-penetrating pores per mm$^2$, or less than 10,000, 1000, 100, 50, 25, 20, 15, 10, 5, or equal to or more than about 1 non-penetrating pore per mm$^2$. In some embodiments, a dense membrane can have substantially zero pores penetrating from one major side of the membrane to the other major side having a diameter larger than about 0.00001, 0.0001, 0.001, 0.005, 0.01, 0.05, 0.1, 0.2, 0.3, 0.4, 0.5, 0.6, 0.7, 0.8, 0.9, 1, or larger than about 2 µm, such as less than about 100,000 pores per mm$^2$, or less than about 10,000, 1000, 100, 50, 25, 20, 15, 10, 5, or less than about 1 pore per mm$^2$. Pore size can be determined by the average size of the pore throughout its path through the entire thickness or only partway through the membrane. Pore size can be determined by the average size of the pore at the surface of the membrane. Any suitable analytical technique can be used to determine the pore size. Embodiments encompass dense membranes having any combination of approximate maximum sizes from the dimensions given in this paragraph for each of the pores passing all the way through the membrane, cylinder pores, sponge pores, blind pores, any other type of pore, or combination thereof. In some embodiments, a dense membrane does have at least one of pores passing all the way through the membrane, cylinder pores, sponge pores, blind pores, and any other type of pore, wherein the pores have a size smaller than the maximum size of the dimensions given in this paragraph.

The one or more membranes can have any suitable thickness. In some examples, the one or more membranes have a thickness of about 1 µm to about 20 µm, or about 2, 3, 4, 5, 6, 7, 8, 9, 10, 11, 12, 13, 14, or 15 µm to about 20 µm. In some examples, the one or more membranes have a thickness of about 0.1 µm to about 300 µm, or about 10, 15, 20, 25, or 30 µm to about 200 µm. In other examples, the one or more membranes have a thickness of about 0.01 µm to about 2000 µm, or about 0.01 µm or less, about 0.1 µm, 1, 2, 3, 4, 5, 10, 15, 20, 25, 30, 40, 50, 60, 70, 80, 90, 100, 110, 120, 130, 140, 150, 160, 170, 180, 190, 200, 210, 220, 230, 240, 250, 260, 270, 280, 290, 300, 350, 400, 500, 600, 700, 800, 900, 1000, 1250, 1500, 1750 µm, or about 2000 µm or more.

The one or more membranes can be selectively permeable to one substance over another. In one example, the one or more membranes are selectively permeable to one volatile compound over other volatile compound or over other materials in the feed mixture. In some embodiments, the membrane has a permeability coefficient of the one or more volatile compound of about 0.001 or less, or at least about 0.01 Barrer, 0.1, 1, 5, 10, 20, 30, 40, 50, 60, 70, 80, 90, 100, 120, 140, 160, 180, 200, 240, 280, 300, 400, 500, 600, 700, 800, 900, 1000, 1200, 1400, 1600, 1800, 2000, 5000, 10000, 50000, 100000 or at least about 200000 Barrer, when tested at room temperature without the sweep medium present.

The one or more membranes can have any suitable shape. In some examples, the one or more membranes are plate-and-frame membranes, spiral wound membranes, tubular membranes, capillary fiber membranes, or hollow fiber membranes. To facilitate suitable routing of the feed and sweep fluids, the membrane modules may be equipped with spacers, channels, baffles, and other flow altering components. The one or more membranes can be a hollow fiber membrane module containing a plurality of hollow fiber membranes, each fiber having a bore side and a shell side. The fibers in a hollow fiber membrane module can collectively have a bore side and a shell side accessible through a single connector on each side of the module. Alternately, the fibers in a hollow fiber membrane module can have a bore side and a shell side accessible through multiple connectors placed at various points in the module. In some embodiments of the method, the feed mixture can be contacted to the bore side of the one or more hollow fiber membranes, and the sweep medium can be contacted to the shell side. In other embodiments of the method, the feed mixture can be contacted to the shell side of the one or more hollow fiber membranes, and the sweep medium can be contacted to the bore side.

The one or more membranes can be free-standing or supported by a porous substrate. In some embodiments, the total pressure on either side of the one or more membranes can be about the same. In other embodiments, there can be a total pressure differential between one side of the one or more membranes and the other side of the one or more membranes. For example, the total pressure on the feed and retentate side of the one or more membranes can be higher than the total pressure on the permeate side of the one or more membranes. In other examples, the total pressure on the permeate side of the one or more membranes can be higher than the total pressure on the retentate side of the one or more membranes.

Any number of membranes can be used to accomplish the separation. Any combination of free-standing and supported membranes can be used. Any suitable surface area of the one or more membranes can be used. For example, the surface area of each membrane, or the total surface area of the membranes, can be about 0.01 m$^2$, 0.1, 1, 2, 3, 4, 5, 10, 100, 200, 300, 400, 500, 600, 700, 800, 900, 1000, 1200, 1400, 1600, 1800, 2000, 2200, 2400, 2600, 2800, 3000, 3200, 3400, 3800, 4000, 5000, 10,000, 50,000, 100,000, 500,000, or about 1,000,000 m$^2$.

In one example, the one or more membranes are one or more hollow tube or fiber membranes. Any number of hollow tube or fiber membranes can be used. For example, 1 hollow tube or fiber membrane, 2, 3, 4, 5, 10, 20, 50, 100, 500, 1000, 2000, 5000, 10,000, 100,000 or about 1,000,000 hollow tube or fiber membranes can be used together as the one or more membranes. In one example, the one or more membranes are crosslinked silicone or organopolysiloxane hollow tube or fiber membranes. In one example, the one or more membranes are one or more free standing hollow tube or fiber membranes (e.g., having no porous support). In one example, the one or more membranes are crosslinked silicone or organopolysiloxane free standing hollow tube or fiber membranes (e.g., having no porous support). The one or more hollow tube or fiber membranes can be in the form of a modular cartridge, such that the one or more membranes can be easily replaced or maintained. In one embodiment, the inside of the one or more hollow tube or fiber membranes can be the first side of the one or more membranes, and the outside of the one or more hollow tube or fiber membranes can be the second side of the one or more membranes. In another embodiment, the outside of the one or more hollow tube or fiber membranes can be the first side of the one or more membranes, and the inside of the one or more hollow tube or fiber membranes can be the second side of the one or more membranes. In some examples, a pressure difference is maintained between the first and second side of the one or more hollow tube or fiber membranes.

In some embodiments, various embodiments of the present invention can provide a module that allows limited or no heat transfer from the sweep medium to the feed components or retentate components or vice versa. In other embodiments, various embodiments of the present invention can provide a module that allows substantial heat transfer from the medium to the feed components or retentate components or vice versa. For example, the present invention can provide a system that allows concurrent heat and mass exchange between the feed composition and the sweep medium.

In some embodiments of the present invention, the membrane is supported on a porous or highly permeable non-porous substrate. The substrate can be any suitable substrate. A supported membrane has the majority of the surface area of at least one of the two major sides of the membrane contacting a porous or highly permeable non-porous substrate. A supported membrane on a porous substrate can be referred to as a composite membrane, where the membrane is a composite of the dense membrane and the porous substrate. The porous substrate on which the supported membrane is located can allow gases or liquids to pass through the pores and to reach the membrane. The supported membrane can be attached (e.g., adhered) to the porous substrate. The supported membrane can be in contact with the substrate without being adhered. The porous substrate can be partially integrated, fully integrated, or not integrated into the membrane. In some embodiments, the supported membrane can have a porous, hydrophobic support with a hydrophobic, permeable dense coating layer, such as a siloxane film. In some embodiments, the porous support may be a hydrophilic polymer that has been surface modified to resist the intrusion of water and other liquids into the pores.

In some embodiments, the membrane is unsupported, also referred to as free-standing. The majority of the surface area on each of the two major sides of a membrane that is free-standing is not contacting a substrate, whether the substrate is porous or not. In some embodiments, a membrane that is free-standing can be 100% unsupported. A membrane that is free-standing can be supported at the edges or at the minority (e.g., less than 50%) of the surface area on either or both major sides of the membrane. A free-standing membrane can have any suitable shape, regardless of the percent of the free-standing membrane that is supported. Examples of suitable shapes for free-standing membranes include, for example, squares, rectangles, circles, tubes, cubes, spheres, cones, cylinders, and planar sections thereof, with any thickness, including variable thicknesses.

The one or more membranes can include the cured product of an organosilicon composition. The organosilicon composition can be any suitable organosilicon composition. The curing of the organosilicon composition gives a cured product of the organosilicon composition. The curable organosilicon composition includes at least one suitable organopolysiloxane compound. The silicone composition includes suitable ingredients to allow the composition to be curable in any suitable fashion. In addition to the at least one suitable polysiloxane, the organosilicon composition can include any suitable additional ingredients, including any suitable organic or inorganic component, including components that do not include silicon, or including components that do not include a polysiloxane structure. In some examples, the cured product of the silicone composition includes a polysiloxane.

The curable silicon composition can include molecular components that have properties that allow the composition to be cured. In some embodiments, the properties that allow the silicone composition to be cured are specific functional groups. In some embodiments, an individual compound contains functional groups or has properties that allow the silicone composition to be cured by one or more curing methods. In some embodiments, one compound can contain functional groups or have properties that allow the silicone composition to be cured in one fashion, while another compound can contain functional groups or have properties that allow the silicone composition to be cured in the same or a different fashion. The functional groups that allow for curing can be located at pendant or, if applicable, terminal positions in the compound.

The curable silicon composition can include an organosilicon compound. The organosilicon compound can be any organosilicon compound. The organosilicon compound can be, for example, a silane (e.g, an organosilane), a polysilane (e.g., an organopolysilane), a siloxane (e.g., an organosiloxane such as an organomonosiloxane or an organopolysiloxane), a polysiloxane (e.g., an organopolysiloxane), or a polysiloxane-organic copolymer, such as any suitable one of such compound as known in the art. The curable silicone composition can contain any number of suitable organosilicon compounds, and any number of suitable organic compounds. An organosilicon compound can include any functional group that allows for curing.

In some embodiments, the organosilicon compound can include a silicon-bonded hydrogen atom, such as organohydrogensilane or an organohydrogensiloxane. In some embodiments, the organosilicon compound can include an alkenyl group, such as an organoalkenylsilane or an organoalkenyl siloxane. In other embodiments, the organosilicon compound can include any functional group that allows for curing. The organosilane can be a monosilane, disilane, trisilane, or polysilane. Similarly, the organosiloxane can be a disiloxane, trisiloxane, or polysiloxane. The structure of the organosilicon compound can be linear, branched, cyclic, or resinous. Cyclosilanes and cyclosiloxanes can have from 3 to 12 silicon atoms, alternatively from 3 to 10 silicon atoms, alternatively from 3 to 4 silicon atoms.

The organosilicon compound can be an organopolysiloxane compound. In some examples, the organopolysiloxane compound has an average of at least one, two, or more than two functional groups that allow for curing. The organopolysiloxane compound can have a linear, branched, cyclic, or resinous structure. The organopolysiloxane compound can be a homopolymer or a copolymer. The organopolysiloxane compound can be a disiloxane, trisiloxane, or polysiloxane. The organopolysiloxane compound can be a single organopolysiloxane or a combination including two or more organopolysiloxanes that differ in at least one of the following properties: structure, viscosity, average molecular weight, siloxane units, and sequence.

System.

In various embodiments, the present invention provides a system for separating a volatile compound from a liquid mixture comprising an emulsion. The system can be any suitable system than can perform an embodiment of the method described herein. For example, the system can include a first membrane. The system can include a liquid feed mixture including a polymer and at least one volatile compound, the liquid feed mixture contacting a first side of the first membrane. The system can include a sweep medium including at least one sweep liquid, the sweep medium contacting a second side of the membrane. The system can include a permeate mixture on the second side of the membrane, the permeate mixture formed by the contacting of the first side with the feed mixture and the second side with the sweep medium, wherein the permeate mixture is enriched in the volatile compound. The system includes a retentate mixture on the first side of the membrane, the retentate mixture formed by the contacting of the first side with the feed mixture and the second side with the sweep medium, wherein the retentate mixture is depleted in the volatile compound.

EXAMPLES

Various embodiments of the present invention can be better understood by reference to the following Examples which are offered by way of illustration. The present invention is not limited to the Examples given herein.

Comparative Example 1: Cyclics Removal Using Vacuum Driven Membrane Separation—Lumen Feed A feed mixture of a previously untreated (product as-received) aqueous silicone microemulsion comprising a high viscosity internal phase of polydimethylsiloxane in 60 wt % water in a 500 ml separatory funnel was pre-heated to 35° C. and fed into the bore side of a silicone hollow fiber membrane module having a membrane surface area of 2500 $cm_2$ (MedArray, Inc. Permselect PDMSXA-2500). The feed fluid exiting the membrane module was recycled back to the feed reservoir continuously. All but one of the ports on the shell side of the module were sealed off to allow vacuum to be applied to the shell side using a rotary vacuum pump with a dry ice/isopropanol cold trap to collect condensable volatiles in the permeate. The vacuum stream exited the shell on the opposite end of the feed, resulting in a radial counter flow pattern. The process was allowed to run continuously for a given time until the feed emulsion viscosity became too high to pass through the bore of the fibers due to loss of water through the membrane. The resulting product was analyzed by gas chromatography (GC) to determine D4 and D5 content using the method of Reference Example 1, along with an unstripped sample to determine the original D4 and D5 content. Because of the water loss, a non-volatile content test was performed on the final product using the method of Reference Example 2 to normalize cyclics content by the non-volatile content to allow comparison of cyclics content against the original sample. The increase in non-volatile content (NVC) confirms that water loss is significant from the emulsion. Results are shown in Table 1.

Comparative Example 2: Cyclics Removal Using Vacuum Driven Membrane Separation—Shell Side Feed A feed mixture of a previously untreated (product as-received) aqueous silicone microemulsion comprising a high viscosity internal phase of polydimethylsiloxane in 60 wt % water (same starting material as used in Comparative Example 1) in a 500 ml separatory funnel was pre-heated to 35° C. and fed into the shell side of a 2500 cm2 membrane identical to that used in Comparative Example 1. The feed fluid exiting the membrane module was recycled back to the feed reservoir continuously. The feed end side port on the lumen side of the module was sealed off to allow vacuum to be applied to the shell side in a radial counter-flow pattern using a rotary vacuum pump with a dry ice/isopropanol cold trap to collect condensables in the permeate. The process was allowed to run continuously for a given time until the feed emulsion viscosity became too high to pass through the bore of the fibers due to loss of water through the membrane. The resulting product was analyzed by GC to determine D4 and D5 content using the method of Reference Example 1, along with an unstripped sample to determine the original D4 and D5 content. Because of the water loss, a non-volatile content test was performed on the final product using the method of Reference Example 2 to normalize cyclics content by the non-volatile content to allow comparison of cyclics content against the original sample. The increase in NVC confirms that water loss is significant from the emulsion. Results are shown in Table 1.

Reference Example 1: Gas Chromatography to Analyze D4, D5 Content

Approximately 0.5 g of sample was treated with 5 mL methanol and 10 mL hexane along with dodecane as an internal standard. The samples were shaken for ~2 hours at room temperature. Then 5 mL of water was added and the samples were shaken briefly by hand. The samples were then centrifuged and the hexane layer (top) was withdrawn and analyzed using gas chromatography with flame ionization detection. Peaks were identified by retention time matching to reference materials and are tentative. D4 and D5 were quantified using experimental response factors relative to the internal standard. The derivatization was prepared by taking 1 mL of the hexane phase from the MMB and treated with 200 uL HDMZ and incubated at room temperature for at least 1 hour before analysis.
GC07B conditions—CTM 0839
Oven 50° C.(1)–300° C.(10)@15° C./minute-305° C.(5) @15° C./min
Inlet—250° C. 50:1 split
Detector—FID, 300° C., Range=0
Column—DB-1 30 m×0.25 mm×0.1 micron film
1.5 ml/min flow, velocity=34, carrier was helium
Injection volume=1 microliter Reference Example 2: Non-Volatile Content Determination Via Microwave Method About 2 g of sample was placed between fiberglass mats designed for the microwave NVC analysis and heated for 6 minutes on 100% power in a CEM Smart System 5 microwave that measures weight loss in-situ to determine NVC.

Reference Example 3: Non-Volatile Content Determination Via Open Cup Method

About 2 g of sample was placed in a clean aluminum dish and pre-weighed on a 4 place balance to determine initial weight ($W_i$), then heated for 2 hours at 105° C. Upon cooling, the sample was reweighed ($W_f$) to determine the NVC via the following formula: NVC (wt %)=(1-($W_i$-$W_f$)/($W_i$))*100%. Both methods of Reference Example 2 and 3 have been shown to provide similar results using standard reference samples.

Example 1: Removing Cyclosiloxanes from a Silicone Emulsion Via Sorbent Liquid Membrane Contacting Using 2 Membrane Modules A membrane contacting system was created as shown schematically in FIG. 1, featuring two silicone hollow fiber membrane modules (MedArray PermSelect 2500 cm2 membrane area). One module serves as the absorber reducing volatile siloxanes from the emulsion feed, while the second module serves as a desorber to regenerate the sorbent liquid sweep fluid. A previously untreated (product as-received) aqueous silicone microemulsion comprising a high viscosity internal phase of polydimethylsiloxane in 60 wt % water (same starting material as used in Comparative Example 1) was pre-heated by passing through a section of ¼" stainless steel tubing wrapped with heat tape to 35° C. and fed into the bore side of an absorption module from a first separatory 500 ml funnel that served as the feed reservoir. 50 cSt polydimethylsiloxane fluid (Dow Corning Corp.) as the sorbent liquid was fed counter-current into the shell side of an absorption module from a second 500 ml separatory funnel to provide the driving force for permeation of cyclosiloxanes through the silicone membrane. Both fluids (the emulsion and sweep) were fed counter-current to each other through the membrane module using a multi-cassetted peristaltic pump at a flow rate of 15 ml/min. Prior to entering the absorption module, the sorbent sweep fluid was cooled to about 20° C. by passing through a copper coil immersed in an ice bath. Upon exiting the absorber, the sweep fluid was heated to 75° C. prior to entering the bore side of the desorption module, then recirculated continuously back through the cooling coil to the absorber. The feed fluid exiting the absorption module was recirculated continuously to the feed reservoir for 7 hours until the process was stopped, and samples taken for analysis by gas chromatography (GC). The resulting product was analyzed by GC to determine D4 and D5 content using the method of Reference Example 1, along with an unstripped sample to determine the original D4 and D5 content. The samples were also tested for NVC according to the method of Reference Method 2 to determine amount of water loss from the emulsion. If needed any water collected in the second separatory funnel could be decanted back into the feed reservoir to minimize viscosity changes resulting from the permeation of water through the membrane.

Example 2: Removing Cyclosiloxanes from a Silicone Emulsion Via Sorbent Liquid Membrane Contacting The method of Example 1 was repeated feeding the same emulsion that was treated in the previous run but by feeding the emulsion at a temperature of 45° C. into the absorber.

Example 3: The Method of Example 2 was Repeated but Using an Emulsion Feed Temperature of 55° C.

Results are shown for Examples 1-3 in Table 1 for 3 different feed temperature conditions. Even at the higher feed temperatures of Examples 2 and 3, very little water was collected from the fluid sweeping experiment compared to the vacuum experiments of Comparative Example 1 and 2, resulting in a stable, low viscosity of the feed stream throughout the process. The relatively small changes in NVC for Examples 1-3 relative to the unstripped control confirm that the water loss was minimal in the emulsion through this process. These results demonstrate the benefit of the silicone fluid sorption process in selectively reducing the concentration of volatile siloxanes in the emulsion to lower levels more efficiently while also reducing the flux of water vapor.

TABLE 1

Summary of Examples 1-3

| Sample | Feed Temp (° C.) | Pump flow rate (ml/min) | Fluid Sweep Temp (° C.) | Permeate Pressure (Torr) | Time (hrs) | Product D4 (wt %) | Product D5, (wt %) | Viscosity change | NVC (wt %) | Total Residual D4 (wt %) | Total Residual D5 (wt %) |
|---|---|---|---|---|---|---|---|---|---|---|---|
| Unstripped Control Emulsions for Comparative Examples 1 & 2 | NA | NA | NA | NA | NA | 1.39 | 0.98 | Stable | 41.65 | 1.39 | 0.98 |
| Comparative Example 1 | 35 | 9.4 | NA | 5 | 20 | 1.32 | 1.22 | Thickens | 51.71 | 1.06 | 0.98 |
| Comparative Example 2 | 35 | 9.4 | NA | 5 | 24 | 1.07 | 1.29 | Thickens | 55.29 | 0.81 | 0.97 |
| Unstripped Control Emulsions for Examples 1-3 | NA | NA | NA | NA | NA | 1.50 | 1.10 | Stable | 39.87 | 1.50 | 1.10 |
| Example 1 | 35 | 15 | 75 | 760 | 7 | 0.65 | 0.99 | Stable | 40.37 | 0.64 | 0.98 |
| Example 2 | 45 | 15 | 75 | 760 | 7 | 0.23 | 0.90 | Stable | 41.24 | 0.22 | 0.87 |
| Example 3 | 55 | 15 | 75 | 760 | 7 | 0.10 | 0.79 | Stable | 42.96 | 0.09 | 0.73 |

Examples 4-22: Removing Cyclosiloxanes from a Silicone Emulsion Via Sorbent Liquid Membrane Contacting with a Direct Contact Column for Regenerating the Silicone Sorbent Sweep Fluid A membrane contacting system was created similar to that shown in FIG. 2, featuring a silicone hollow fiber membrane module (MedArray PermSelect 2500 cm2 membrane area) as the absorber for removal of volatile siloxanes from the emulsion feed, and a Vigreux distillation column instead of the second membrane module as the desorber for regenerating the silicone sorbent sweep fluid. A previously untreated (product as-received) aqueous silicone microemulsion comprising a high viscosity internal phase of polydimethylsiloxane in 60 wt % water (same starting material as used in Comparative Example 1) was pre-heated by passing through a section of ¼" stainless steel tubing wrapped with heat tape and fed into the bore side of an absorption module from a first separatory 500 ml funnel that served as the feed reservoir. 50 cSt polydimethylsiloxane fluid (Dow Corning Corp.) as the sorbent liquid was fed counter-current into the shell side of an absorption module from a second 500 ml separatory funnel to provide the driving force for permeation of cyclosiloxanes through the silicone membrane. Both fluids (the emulsion and sweep) were fed counter-current to each other through the membrane module using a multi-cassetted peristaltic pump at a flow rate of ~14 ml/min. Prior to entering the absorption module, the sorbent sweep fluid was heated by passing through a stainless steel coil wrapped with heat tape. Upon exiting the absorber, the sweep fluid was heated by passing through a section of ¼" stainless steel tubing wrapped with heat tape prior to entering the top of a Vigreux Distillation Column outfitted with dry N2 sweep gas, then recirculated continuously back through the heating coil to the absorber. The feed fluid exiting the absorption module was recirculated continuously to the feed reservoir until the process was stopped, and samples taken for analysis by gas chromatography (GC). In each subsequent run, the emulsion in reservoir following the preceding run was used as the feed at the feed temperature noted in Table 2. The resulting product was analyzed by GC to determine D4 and D5 content using the method of Reference Example 1, along with an unstripped sample to determine the original D4 and D5 content. If needed any water collected in the second separatory funnel could be decanted back into the feed reservoir to minimize viscosity changes resulting from the permeation of water through the membrane.

Results are shown for Examples 4-22 in Table 2 for the different feed, sweep, and desorber temperature conditions. These results demonstrate feasibility of reducing both D4 and D5 levels in an emulsion well below 0.1 wt % using an embodiment of this invention.

Upon exiting the absorber, the sweep fluid was recycled back to a second 500 ml separatory funnel. The feed fluid exiting the absorption module was recirculated continuously to the feed reservoir until the process was stopped, and the resulting product samples were taken for analysis by gas chromatography (GC). The resulting product samples and an unstripped product sample were analyzed by GC, using the method of Reference Example 1, to determine VOC content of the product samples and the unstripped sample. (If needed, any water collected in the second separatory funnel

TABLE 2

Summary of Examples 4-22

| Sample | Feed Temp (° C.) | Pump Flow Rate (ml/min) | Fluid Sweep Temp. (° C.) | Permeate Pressure (Torr) | Time (hrs.) | Product D4 (wt %) | Product D5 (wt %) | Viscosity Change |
|---|---|---|---|---|---|---|---|---|
| Example #4 | 35 | 14.1 | 22.3 | 760 | 2 | 1.03 | 0.82 | Stable |
| Example #5 | 45 | 14.1 | 22.5 | 760 | 2 | 0.93 | 0.82 | Stable |
| Example #6 | 55 | 14.1 | 22.6 | 760 | 2 | 0.8 | 0.82 | Stable |
| Example #7 | 65 | 14.1 | 23.2 | 760 | 2 | 0.48 | 0.77 | Stable |
| Example #8 | 65 | 14.1 | 23.5 | 760 | 2 | 0.42 | 0.77 | Stable |
| Example #9 | 65 | 14.1 | 23.7 | 760 | 2 | 0.33 | 0.75 | Stable |
| Example #10 | 75 | 14.1 | 23.2 | 760 | 6 | 0.11 | 0.64 | Stable |
| Example #11 | 65 | 14.1 | 23.6 | 760 | 2 | 0.07 | 0.61 | Stable |
| Example #12 | 65 | 14.1 | 22.8 | 760 | 2 | 0.06 | 0.59 | Stable |
| Example #13 | 85 | 14.1 | 23 | 760 | 2 | 0.03 | 0.53 | Stable |
| Example #14 | 85 | 14.1 | 23.1 | 760 | 2 | 0.02 | 0.53 | Stable |
| Example #15 | 85 | 14.1 | 37.7 | 760 | 2 | <0.01 | 0.48 | Stable |
| Example #16 | 85 | 14.1 | 49.2 | 760 | 4 | <0.01 | 0.38 | Stable |
| Example #17 | 70 | 14.1 | 68.4 | 760 | 3 | <0.01 | 0.29 | Stable |
| Example #18 | 70 | 14.1 | 69.3 | 760 | 2 | <0.01 | 0.27 | Stable |
| Example #19 | 78 | 14.1 | 77.8 | 760 | 2 | <0.01 | 0.21 | Stable |
| Example #20 | 83 | 14.1 | 82.7 | 760 | 2 | <0.01 | 0.16 | Stable |
| Example #21 | 93 | 14.1 | 90.1 | 760 | 4 | <0.01 | 0.09 | Stable |
| Example #22 | 100 | 14.1 | 99.9 | 760 | 6 | <0.01 | 0.05 | Stable |

Example 23: Removal of Volatile Organic Compounds from a Household Emulsion (Clorox Pine-Sol Multi-Surface Cleaner)

A membrane contacting system was constructed featuring a silicone hollow fiber membrane module (MedArray Perm-Select 7500 cm$^2$ membrane area) as the absorber for removal of volatile organic compounds from the emulsion feed. The emulsion feed comprised Pine-Sol brand (Clorox Co.) Multi-Surface cleaning emulsion which was deliberately contaminated with a model VOC (0.52 wt % n-octane determined by GC chromatogram, n-octane from Acros Organics (97 wt %)) by vigorous mixing to disperse the n-octane in the emulsion. The contaminated emulsion sample was pre-heated to 70° C. by passing through a section of ¼" stainless steel tubing wrapped with heat tape and then passed into the bore side of an absorption module from a first separatory 500 ml funnel that serves as the feed reservoir. 50 cSt polydimethylsiloxane fluid (Dow Corning Corp.) as the sorbent liquid was fed counter-current into the shell side of an absorption module from a second 500 ml separatory funnel to provide the driving force for permeation of the VOC through the silicone membrane. Both fluids (the emulsion and sweep) were fed counter-current to each other through the membrane module using a multi-cassetted peristaltic pump. The 50 cSt polydimethylsiloxane fluid and Pine-Sol cleaning emulsion flow rates were 19.8 g/min and 13.9 g/min, respectively. Prior to entering the absorption module, the sorbent sweep fluid was heated to 70° C. by passing through a stainless steel coil wrapped with heat tape.

could be decanted back into the feed reservoir to minimize viscosity changes resulting from the permeation of water through the membrane.)

After running the process for 3.5 hours, the emulsion sample contained no detectable n-octane as determined by the GC chromatogram compared to an initial n-octane concentration of 0.52% (w/w). The sweep fluid, which initially had no n-octane peak in the GC chromatogram, showed a peak associated with n-octane corresponding to an n-octane concentration of 0.31% (w/w), confirming sorption of the VOC into the sorbent sweep fluid.

Example 24: Removal of Volatile Organic Compounds from a Latex Emulsion (Acrylic Paint, Glidden Complete Stainblocking Paint and Primer)

A membrane contacting system was constructed featuring a silicone hollow fiber membrane module (MedArray Perm-Select 7500 cm$^2$ membrane area) as the absorber for removal of volatile organic compounds from the emulsion feed. The emulsion feed comprised interior eggshell white latex complete stain blocking paint and primer (Glidden) which was deliberately contaminated with a model VOC (0.60 wt. % n-octane) by mixing in a Hauschild mixer for a total of 60 s to disperse the n-octane in the emulsion. The contaminated emulsion sample was pre-heated to 70° C. by passing through a section of ¼ inch (0.64 cm) stainless steel tubing wrapped with heat tape and fed into the shell side of an absorption module from a first 500 ml separatory funnel that served as the feed reservoir. 50 cSt polydimethylsiloxane fluid (Dow Corning Corp.) as the sorbent liquid was fed counter-current into the bore side of an absorption module from a second 500 ml separatory funnel to provide the driving force for permeation of the VOC through the silicone membrane. Both fluids (the emulsion and sweep) were fed counter-current to each other through the membrane module using a multi-cassetted peristaltic pump. The 50 cSt polydimethylsiloxane fluid and Glidden latex paint emulsion flow rates are 19.8 g/min and 7.7 g/min, respectively. Prior to entering the absorption module, the sorbent sweep fluid was heated to 70° C. by passing through a stainless steel coil wrapped with heat tape. Upon exiting the absorber, the sweep fluid was recycled back to the second 500 ml separatory funnel. The feed fluid exiting the absorption module was recirculated continuously to the feed reservoir until the process was stopped, when samples taken for analysis by gas chromatography (GC). The resulting product and an unstripped sample were analyzed by GC using the method of Reference Example 1 to determine the original VOC content and that of the sample. If needed, any water collected in the second separatory funnel could be decanted back into the feed reservoir to minimize viscosity changes resulting from the permeation of water through the membrane.

The emulsion sample after running the process for 68 minutes showed a reduction in n-octane concentration from 0.60 wt. % to 0.28 weight (wt.) percent (%). The sweep fluid, which initially had no n-octane peak in the GC chromatogram, showed a peak associated with n-octane corresponding to an n-octane concentration of 0.20 wt. % after running the process for 68 minutes, confirming adsorption of the VOC into the sorbent sweep fluid.

Example 25 (Prophetic): Removal of Volatile Organic Compounds from a Common Food Emulsion (Whole Milk)

Figure 2:
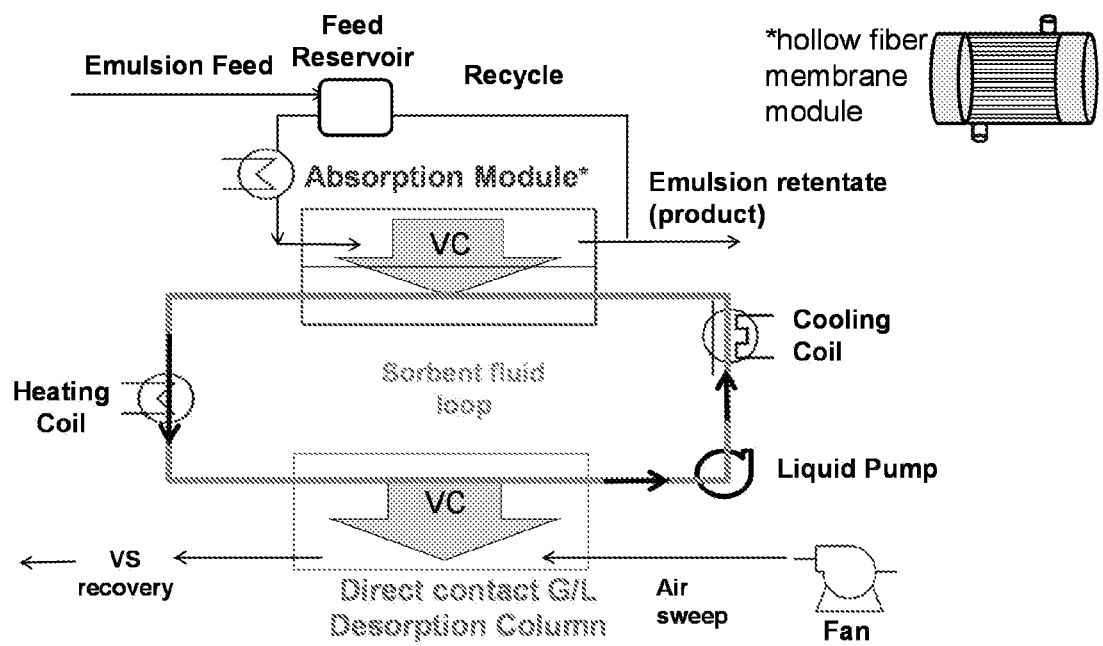
FIG. 2 illustrates a system for separating a volatile compound from an emulsion wherein the system comprises a desorption module that comprises a direct contact column instead of a membrane. VC means volatile compound.

A membrane contacting system is created similar to that shown in FIG. 2, featuring a silicone hollow fiber membrane module (MedArray PermSelect 2500 cm2 membrane area) as the absorber for removal of volatile organic compounds from the emulsion feed, and a Vigreux distillation column instead of the second membrane module as the desorber for regenerating the silicone sorbent sweep fluid. In this case, the emulsion feed comprises pasteurized and homogenized Vitamin D milk (Kroger) which is deliberately contaminated with a model VOC (0.5 wt. % n-octane) by mixing in a Hauschild mixer for 30 s to disperse the n-octane in the emulsion. The contaminated milk sample is pre-heated by passing through a section of ¼" stainless steel tubing wrapped with heat tape and feed into the bore side of an absorption module from a first separatory 500 ml funnel that serves as the feed reservoir. 50 cSt polydimethylsiloxane fluid (Dow Corning Corp.) as the sorbent liquid is fed counter-current into the shell side of an absorption module from a second 500 ml separatory funnel to provide the driving force for permeation of the VOC through the silicone membrane. The fluids are fed using a multi-cassetted peristaltic pump at a flow rate of ~17 ml/min. Prior to entering the absorption module, the sorbent sweep fluid is heated by passing through a stainless steel coil wrapped with heat tape. Upon exiting the absorber, the sweep fluid is heated by passing through a section of ¼" stainless steel tubing wrapped with heat tape prior to entering the top of a Vigreux Distillation Column outfitted with dry N2 sweep gas, then recirculates continuously back through the heating coil to the absorber. The feed fluid exiting the absorption module is recirculated continuously to the feed reservoir until the process is stopped, and samples taken for analysis by gas chromatography (GC). The resulting product is analyzed by GC to determine VOC content using the method of Reference Example 1, along with an unstripped sample to determine the original VOC content. If needed any water collected in the second separatory funnel could be decanted back into the feed reservoir to minimize viscosity changes resulting from the permeation of water through the membrane.

By pre-heating the contaminated milk to 70° before feeding it to the absorption module, and providing a warmed sweep fluid at 70° C., the resulting sample is collected and tested. The milk sample after running the process for 1 hour shows a significant reduction in the starting concentration of n-octane without significant change in appearance or viscosity. The sweep fluid, which initially has no n-octane peak in the GC chromatogram shows a peak associated with n-octane, confirming adsorption of the VOC into the sorbent sweep fluid.

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present invention. Thus, it should be understood that although the present invention has been specifically disclosed by specific embodiments and optional features, modification and variation of the concepts herein disclosed may be resorted to by those of ordinary skill in the art, and that such modifications and variations are considered to be within the scope of embodiments of the present invention.

ADDITIONAL EMBODIMENTS

The following exemplary embodiments are provided, the numbering of which is not to be construed as designating levels of importance:

Embodiment 1

A method of separating a volatile compound from a liquid feed mixture comprising an emulsion, the method comprising:
contacting a first side of a first membrane with the liquid feed mixture comprising the emulsion having at least one volatile compound; and
contacting a second side of the first membrane with a sweep medium comprising a sweep fluid, to produce a permeate mixture on the second side of the first membrane and a retentate mixture comprising the emulsion on the first side of the first membrane, wherein the permeate mixture is enriched in the volatile compound, and the retentate mixture is depleted in the volatile compound.

Embodiment 2

The method of Embodiment 1, wherein the emulsion further comprises a polymer selected from an organic polymer or organopolysiloxane polymer.

Embodiment 3

The method of Embodiment 1 or 2, wherein the volatile compound comprises a volatile organic compound, a volatile inorganic compound, a volatile siloxane, a volatile linear siloxane, and/or a volatile cyclicsiloxane.

Embodiment 4

A method of separating a volatile siloxane from a liquid feed mixture comprising an emulsion, the method comprising:
contacting a first side of a first membrane with the liquid feed mixture comprising the emulsion having a polymer, and at least one volatile siloxane; and
contacting a second side of the first membrane with a sweep medium comprising a sweep fluid, to produce a permeate mixture on the second side of the first membrane and a retentate mixture comprising the emulsion on the first side of the first membrane, wherein the permeate mixture is enriched in the volatile siloxane, and the retentate mixture is depleted in the volatile siloxane.

Embodiment 5

The method of Embodiment 4, wherein the polymer of the emulsion comprises an organopolysiloxane.

Embodiment 6

The method of any of the preceding Embodiments, wherein the retentate mixture is depleted in the volatile siloxane by 1 wt % to 99.99 wt %, as compared to the liquid feed mixture.

Embodiment 7

The method of any of the preceding Embodiments, wherein the first membrane is hydrophobic.

Embodiment 7

The method of any of the preceding Embodiments, wherein the first membrane is nonporous.

Embodiment 8

The method of any of the preceding Embodiments, wherein the first membrane is a dense silicone membrane.

Embodiment 9

The method of any of the preceding Embodiments, wherein the first membrane has a thickness of about 0.01 µm to about 300 µm.

Embodiment 10

The method of any of the preceding Embodiments, wherein the first membrane is an unsupported membrane.

Embodiment 11

The method of any of the preceding Embodiments, wherein the first membrane is a hollow fiber membrane module comprising a bundle of hollow fibers, wherein the fibers collectively have a bore-side and a shell-side, wherein at least one of
the first side of the hollow fiber membrane is the bore-side and the second side of the hollow fiber membrane is the shell-side, and
the first side of the hollow fiber membrane is the shell-side and the second side of the hollow fiber membrane is the bore-side.

Embodiment 12

The method of any of the preceding Embodiments, wherein the sweep fluid comprises an organosilicon fluid comprising at least one of an organosiloxane, an organosilane and/or a liquid hydrocarbon.

Embodiment 13

The method of Embodiment 12, wherein the organosilicon fluid comprises at least one silicon-bonded group chosen from a substituted or unsubstituted $(C_1$-$C_{20})$hydrocarbyl interrupted or terminated with 0, 1, 2, or 3 groups selected from —O—, —NH—, and —S—, substituted or unsubstituted $(C_1$-$C_{20})$alkyl, substituted or unsubstituted $(C_6$-$C_{20})$aryl, and a substituted or unsubstituted polyether.

Embodiment 14

The method of Embodiment 12, wherein the liquid hydrocarbon comprises at least one substituted or unsubstituted alkane having from 5 to 12 carbon atoms.

Embodiment 15

The method of Embodiment 12, wherein the sweep fluid comprises at least one of an organosiloxane and/or an organosilane and comprises less than 10% (w/w), alternatively 0 to 10% (w/w), alternatively less than 5% (w/w), alternatively from 0 to 5% (w/w), alternatively less than 1% (w/w), alternatively from 0 to 1% (w/w), alternatively the sweep liquid is substantially-free of liquid hydrocarbon or other silicon-free organic liquid as measured prior to contacting the second side of the membrane. As used herein, substantially-free, with respect to the amount of liquid hydrocarbon, means containing less than 1% (w/w), alternatively less than 0.5% (w/w), alternatively having no detectable amount.

Embodiment 16

The method of any of the preceding Embodiments, further comprising desorbing the volatile compound from the permeate mixture and recirculating the desorbed permeate mixture into contact with the second side of the first membrane.

Embodiment 17

The method of any one of Embodiments 4 to 16, wherein the volatile siloxane comprises at least one of a cyclosiloxane and a linear siloxane.

Embodiment 18

The method of Embodiment 17, wherein the cyclosiloxane is a substituted or unsubstituted cyclosiloxane having about 3 to 20 —Si—O— units in the ring or rings thereof.

Embodiment 19

A method of separating a volatile compound from a liquid feed mixture comprising an emulsion, the method comprising:

contacting a first side of a first membrane with a liquid feed mixture comprising an emulsion having a polymer, and at least one volatile compound, the first membrane comprises a dense silicone membrane having a thickness of about 1 µm to about 300 µm, and the emulsion has a temperature of about 20° C. to about 120° C.; and contacting a second side of the membrane with a sweep medium comprising a sweep liquid to produce a permeate mixture on the second side of the first membrane and a retentate mixture comprising the emulsion on the first side of the membrane, wherein the permeate mixture is enriched in the volatile compound, and the retentate mixture is depleted in the volatile compound by 1 wt % to about 99.99 wt %, as compared to the liquid feed mixture.

Embodiment 20

The method of Embodiment 19, wherein the volatile compound comprises a volatile siloxane and the polymer comprises an organopolysiloxane.

Embodiment 21

The method of Embodiment 19 or 20, wherein the first membrane is hydrophobic.

Embodiment 22

A system for separating a volatile compound from a liquid mixture comprising an emulsion, the system comprising:

a first membrane;

a liquid feed mixture comprising an emulsion having a polymer, and at least one volatile compound, the liquid feed mixture contacting a first side of the first membrane;

a sweep medium comprising at least one sweep liquid, the sweep medium contacting a second side of the first membrane;

a permeate mixture on the second side of the first membrane, wherein the permeate mixture is enriched in the volatile compound;

a retentate mixture on the first side of the first membrane, wherein the retentate mixture is depleted in the volatile compound, wherein the permeate mixture and retentate mixture are formed by the contacting of the sweep medium of the second side of the first membrane and the contacting of the liquid feed mixture of the first side of the first membrane.

Embodiment 23

The system of Embodiment 22, wherein the volatile compound comprises a volatile siloxane and the polymer comprises an organopolysiloxane.

Embodiment 24

The system of Embodiment 22 or 23 wherein the first membrane is hydrophobic.

Embodiment 25

The system of Embodiment 22 or 23, further comprising a desorber wherein the volatile compound from the permeate mixture is removed and the desorbed permeate mixture is recirculated into contact with the second side of the first membrane.

What is claimed is:

1. A method of separating a volatile compound from a liquid feed mixture comprising an emulsion, the method comprising:

contacting a first side of a first membrane with the liquid feed mixture comprising the emulsion having at least one volatile compound; and contacting a second side of the first membrane with a sweep medium comprising a sweep liquid, to produce a permeate mixture on the second side of the first membrane and a retentate mixture comprising the emulsion on the first side of the first membrane, wherein the permeate mixture is enriched in the volatile compound, and the retentate mixture is depleted in the volatile compound, wherein the sweep liquid comprises an organosilicon liquid, and wherein the volatile compound comprises a volatile organic compound, a volatile inorganic compound, a volatile siloxane, a volatile linear siloxane, and/or a volatile cyclosiloxane.

2. The method of claim 1, wherein the emulsion further comprises a polymer selected from an organic polymer or organopolysiloxane polymer.

3. The method of claim 1, including one of more of limitations a) through h):

a) wherein the retentate mixture is depleted in the volatile compound by 1 wt % to 99.99 wt %, as compared to the liquid feed mixture, b) wherein the first membrane is hydrophobic, c) wherein the first membrane is nonporous, d) wherein the first membrane is a dense silicone membrane, e) wherein the first membrane has a thickness of about 0.01 µm to about 300 µm, f) wherein the first membrane is an unsupported membrane, g) wherein the first membrane is a hollow fiber membrane module comprising a bundle of hollow fibers, wherein each of the fibers has a bore-side and a shell-side, wherein at least one of the first side of the hollow fiber membrane is the bore-side and the second side of the hollow fiber membrane is the shell-side, and the first side of the hollow fiber membrane is the shell-side and the second side of the hollow fiber membrane is the bore-side, h) wherein the organosilicon sweep liquid comprising comprises at least one of an organosiloxane, an organopolysiloxane or an organosilane.

4. The method of claim 3, including limitation h) wherein the organosilicon fluid of limitation h) comprises at least one silicon-bonded group chosen from a substituted or unsubstituted $(C_1$-$C_{20})$hydrocarbyl interrupted or terminated with 0, 1, 2, or 3 groups selected from —O—, —NH—, and —S—, substituted or unsubstituted $(C_1$-$C_{20})$alkyl, substituted or unsubstituted $(C_6$-$C_{20})$aryl, and a substituted or unsubstituted polyether.

5. The method of claim 1, further comprising desorbing the volatile compound from the permeate mixture and recirculating the desorbed permeate mixture into contact with the second side of the first membrane.

6. A method of separating a volatile compound from a liquid feed mixture comprising an emulsion, the method comprising:

contacting a first side of a first membrane with the liquid feed mixture comprising the emulsion having a polymer and the volatile compound wherein the polymer is an organopolysiloxane polymer, the volatile compound is a volatile siloxane or both; and contacting a second side of the first membrane with a sweep medium comprising a sweep liquid which comprises at least one of an organosiloxane, an organopolysiloxane, and organosilane, to produce a permeate mixture on the second side of the first membrane and a retentate mixture comprising the emulsion on the first side of the first membrane, wherein the permeate mixture is enriched in the volatile siloxane, and the retentate mixture is depleted in the volatile siloxane.

7. The method of claim 6, wherein the volatile siloxane comprises at least one of a cyclosiloxane and a linear siloxane.

8. The method of claim 7, wherein the cyclosiloxane is a substituted or unsubstituted cyclosiloxane having about 3 to 20 —Si—O— units in the ring or rings thereof.

9. The method of claim 6, including one of more of limitations a) through h):
   a) wherein the retentate mixture is depleted in the volatile compound by 1 wt % to 99.99 wt %, as compared to the liquid feed mixture,
   b) wherein the first membrane is hydrophobic,
   c) wherein the first membrane is nonporous,
   d) wherein the first membrane has a thickness of about 0.01 µm to about 300 µm,
   e) wherein the first membrane is an unsupported membrane,
   f) wherein the first membrane is a hollow fiber membrane module comprising a bundle of hollow fibers, wherein each of the fibers has a bore-side and a shell-side, wherein at least one of
   the first side of the hollow fiber membrane is the bore-side and the second side of the hollow fiber membrane is the shell-side, and
   the first side of the hollow fiber membrane is the shell-side and the second side of the hollow fiber membrane is the bore-side.

10. A method of separating a volatile compound from a liquid feed mixture comprising an emulsion, the method comprising:
   contacting a first side of a first membrane with a liquid feed mixture comprising an emulsion having a polymer, and at least one volatile compound, wherein the volatile compound comprises a volatile organic compound, a volatile inorganic compound, a volatile siloxane, a volatile linear siloxane, and/or a volatile cyclosiloxane, the first membrane comprises a dense silicone membrane having a thickness of about 1 µm to about 300 µm, and the emulsion has a temperature of about 20° C. to about 120° C.; and contacting a second side of the membrane with a sweep medium comprising a sweep liquid, wherein the sweep liquid comprises an organosilicon liquid, to produce a permeate mixture on the second side of the first membrane and a retentate mixture comprising the emulsion on the first side of the membrane, wherein the permeate mixture is enriched in the volatile compound, and the retentate mixture is depleted in the volatile compound by 1 wt % to about 99.99 wt %, as compared to the liquid feed mixture.

11. The method of claim 10, including one or both of the following limitations i) and j):
   i) wherein the volatile compound comprises a volatile siloxane and the polymer comprises an organopolysiloxane,
   j) wherein the first membrane is hydrophobic.

12. A system for separating a volatile compound from a liquid mixture comprising an emulsion, the system comprising:
   a first membrane;
   a liquid feed mixture comprising an emulsion having a polymer, and at least one volatile compound, the liquid feed mixture contacting a first side of the first membrane;
   a sweep medium comprising at least one sweep liquid, the sweep medium contacting a second side of the first membrane to form
   a permeate mixture on the second side of the first membrane, wherein the permeate mixture is enriched in the volatile compound and
   a retentate mixture on the first side of the first membrane, wherein the retentate mixture is depleted in the volatile compound,
   wherein the sweep liquid comprises an organosilicon liquid, the polymer is an organopolysiloxane polymer, and the volatile compound comprises a volatile organic compound, a volatile inorganic compound, and/or a volatile siloxane.

13. The system of claim 12, including one or more of the following limitation k) through m):
   k) wherein the volatile compound comprises a volatile siloxane,
   i) wherein the first membrane is hydrophobic,
   m) further comprising a desorber wherein the volatile compound from the permeate mixture is removed and the desorbed permeate mixture is recirculated into contact with the second side of the first membrane.

* * * * *